(12) United States Patent
Mori et al.

(10) Patent No.: US 8,711,104 B2
(45) Date of Patent: Apr. 29, 2014

(54) POINTER DISPLAY DEVICE, POINTER DISPLAY/DETECTION METHOD, POINTER DISPLAY/DETECTION PROGRAM AND INFORMATION APPARATUS

(75) Inventors: Eijiro Mori, Tokyo (JP); Takuo Ikeda, Tokyo (JP); Ken Yano, Tokyo (JP)

(73) Assignee: Sony Corporation (JP)

( * ) Notice: Subject to any disclaimer, the term of this patent is extended or adjusted under 35 U.S.C. 154(b) by 909 days.

(21) Appl. No.: 12/383,874

(22) Filed: Mar. 30, 2009

(65) Prior Publication Data

US 2009/0251410 A1 Oct. 8, 2009

(30) Foreign Application Priority Data

Mar. 31, 2008 (JP) ................................ P2008-092059

(51) Int. Cl.
*G06F 3/041* (2006.01)

(52) U.S. Cl.
USPC .......................................... 345/173; 715/859

(58) Field of Classification Search
USPC ................... 715/856; 345/157, 173
See application file for complete search history.

(56) References Cited

U.S. PATENT DOCUMENTS

| | | | | |
|---|---|---|---|---|
| 2006/0244735 A1* | 11/2006 | Wilson | ........................... | 345/173 |
| 2007/0030256 A1 | 2/2007 | Akaike et al. | | |
| 2008/0225007 A1* | 9/2008 | Nakadaira et al. | ............ | 345/173 |
| 2008/0303801 A1 | 12/2008 | Akaike et al. | | |
| 2009/0288043 A1* | 11/2009 | Willis | ........................... | 715/859 |

FOREIGN PATENT DOCUMENTS

| | | |
|---|---|---|
| JP | 10283115 A | 10/1998 |
| JP | 11024841 A | 1/1999 |
| JP | 2000112609 A | 4/2000 |
| JP | 2000207094 A | 7/2000 |
| JP | 2003114750 A | 4/2003 |
| JP | 2005063101 A | 3/2005 |
| JP | 2007-041790 A | 2/2007 |
| WO | 2006041097 A1 | 4/2006 |

OTHER PUBLICATIONS

Office Action from Japanese Application No. 2008-092059 dated, Feb. 25, 2010.
Office Action from Japanese Application No. 2008-092059, dated Mar. 17, 2011.
Office Action from Japanese Application No. 2008-092059, dated Jan. 31, 2012.
Office Action from Japanese Application No. 2008-092059, dated Nov. 20, 2012.

* cited by examiner

*Primary Examiner* — Adam R Giesy
(74) *Attorney, Agent, or Firm* — Lerner, David, Littenberg, Krumholz & Mentlik, LLP

(57) ABSTRACT

Disclosed herein is a pointer display device, including, a touch panel provided on a display screen of a display section, a pointer display section configured to detect a contact point in a touch operation on the touch panel and to display a pointer in an area containing the contact point, and a hotspot detection section configured to detect as a hotspot a position corresponding to one part of the pointer exclusive of the contact point.

14 Claims, 20 Drawing Sheets

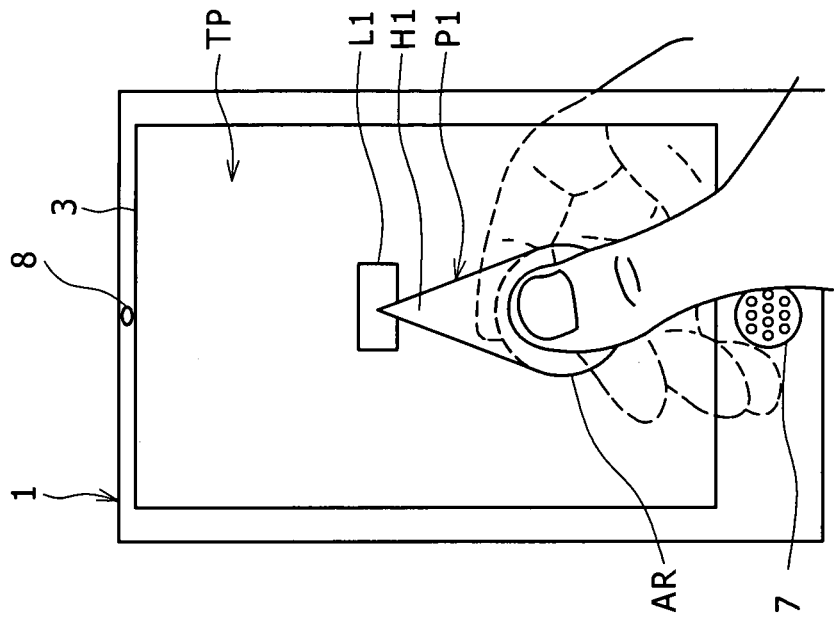
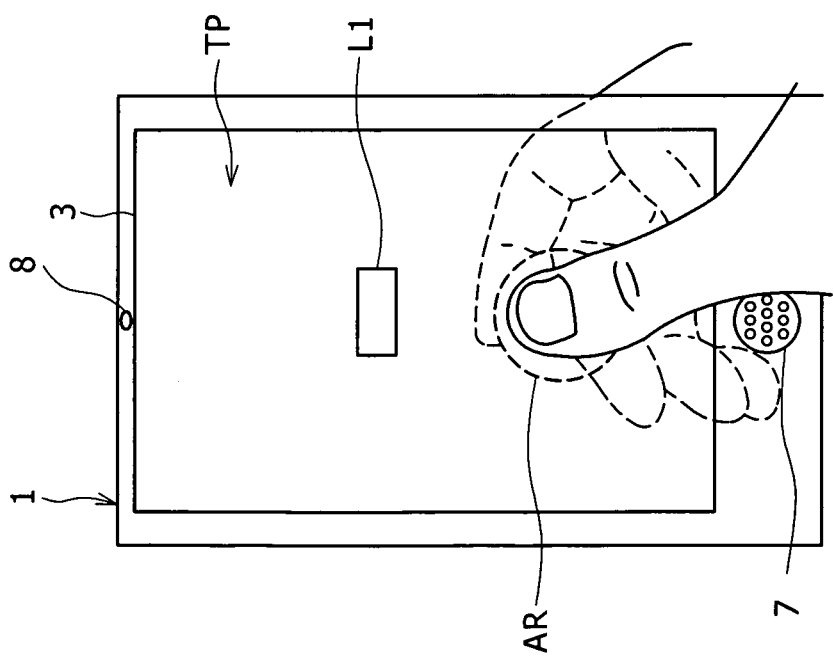

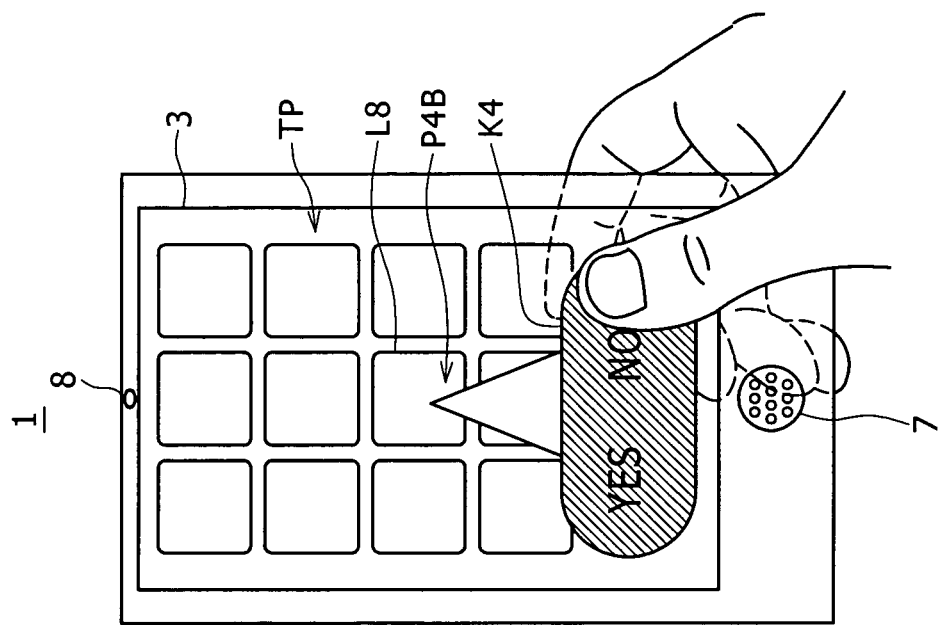
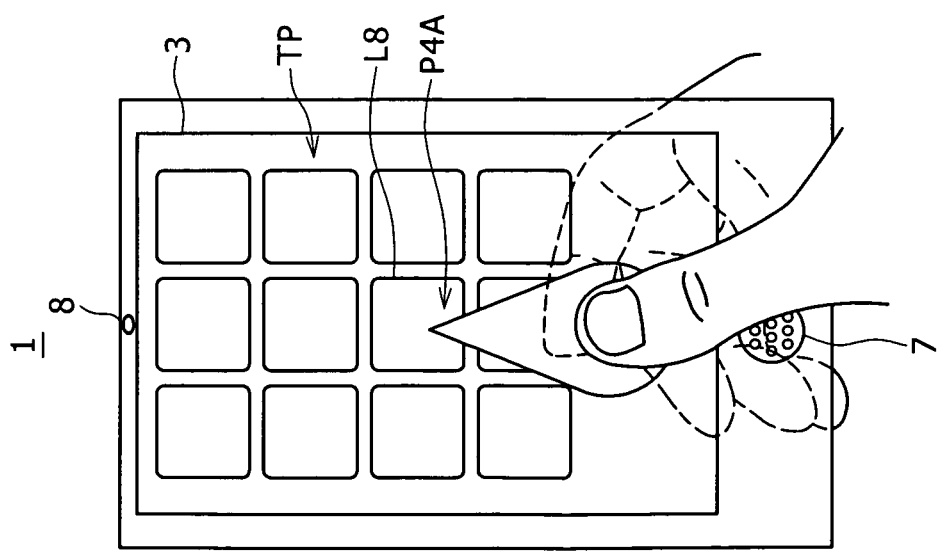

POINTER DISPLAY DEVICE, POINTER DISPLAY/DETECTION METHOD, POINTER DISPLAY/DETECTION PROGRAM AND INFORMATION APPARATUS

CROSS-REFERENCE TO RELATED APPLICATIONS

The present application claims priority from Japanese Patent Application No. JP 2008-092059, filed in the Japanese Patent Office on Mar. 31, 2008, the entire content of which is incorporated herein by reference.

BACKGROUND OF THE INVENTION

1. Field of the Invention

The present invention relates to a pointer display device, a pointer display/detection method, a pointer display/detection program and an information apparatus which are preferable for application to portable information apparatuses having a display unit provided with a touch panel, for example.

2. Description of the Related Art

In portable information apparatuses such as mobile PCs (personal computers), PDAs (personal digital assistants) and portable game machines, miniaturization of various devices has been progressing and miniaturization of the apparatuses themselves has also been made remarkably. Meanwhile, increases in the extents of complexity and versatility of functions of the portable apparatuses have advanced simultaneously, and, therefore, there is a demand for larger-sized displays.

As a result of these two trends, in the information apparatuses, most part of the apparatus body comes to be occupied by the display, reducing the space in which to arrange operation buttons and the like. In this type of information apparatuses, therefore, it is a common practice to adopt such a configuration that user's input operations are received through a touch panel adhered onto the display.

Examples of the display unit employing such a touch panel include one in which, even where the areas of operation elements displayed on the display unit are smaller than the area of the inner surface of a human fingertip, a magnified partition is displayed so as to indicate which partition is being selected by the fingertip, whereby the partition being currently selected by the fingertip can easily be confirmed visually by the user (See, for example, Japanese Patent Laid-open No. 2007-41790).

SUMMARY OF THE INVENTION

In a display device with such a configuration, when the partition being selected with a fingertip is displayed as a magnified partition, the partitions located on the lower side of and adjacent to the magnified partition are hidden by the magnified partition so as to be invisible, which would naturally worsen the convenience in use of the display device.

Thus, there is a need for a pointer display device, a pointer display/detection method, a pointer display/detection program and an information apparatus in which a pointer facilitating user's input operations can be generated and displayed.

In accordance with an embodiment of the present invention, there are provided a pointer display device, a pointer display/detection method and a pointer display/detection program in which a touch point in a touch operation on a touch panel provided over a display screen of a display section is detected, a pointer is displayed in an area containing the touch point, and a position corresponding to one part of the pointer exclusive of the touch point is detected as a hotspot (a position being pointed at).

This ensures that a pointer can be displayed in an area containing the touch point in a touch operation on the touch panel, and a position corresponding to a part of the pointer exclusive of the touch point can be detected as the hotspot. Therefore, when a touch operation is conducted with a fingertip, for example, the hotspot can be detected through one part of the pointer exclusive of the point of touch with the fingertip.

In accordance with another embodiment of the present invention, there is provided an information apparatus including: a display section; a touch panel provided over a display screen of the display section; a pointer display section operative to detect a contact point in a touch operation on the touch panel and to display a pointer in an area containing the contact point; and a hotspot detection section operative to detect as a hotspot a position corresponding to one part of the pointer exclusive of the contact point.

This ensures that a pointer can be displayed in the area containing the touch point upon a touch operation on the touch panel of the information apparatus, and a position corresponding to one part of the pointer exclusive of the touch point can be detected as the hotspot. Therefore, when a touch operation is conducted with a fingertip, for example, the hotspot can be detected through the one part of the pointer exclusive of the touch point of touch with the fingertip.

Thus, according to embodiments of the present invention, it is possible to display a pointer in an area containing a touch point in a touch operation on a touch panel, and to detect as a hotspot a position corresponding to one part of the pointer excluding the touch point. Therefore, when the touch operation is made with a fingertip, for example, the hotspot can be detected through the one part of the pointer exclusive of the touch point in the touch operation. Accordingly, it is possible to realize a pointer display device, a pointer display/detection method, a pointer display/detection program and an information apparatus in which a pointer facilitating user's input operations can be generated and displayed.

BRIEF DESCRIPTION OF THE DRAWINGS

FIGS. 3A and 3B are diagrammatic views showing shapes of a pointer;

FIGS. 22A and 22B are diagrammatic illustrations of a decision technique using a sub-button;

DETAILED DESCRIPTION OF THE PREFERRED EMBODIMENTS

Figure 1:
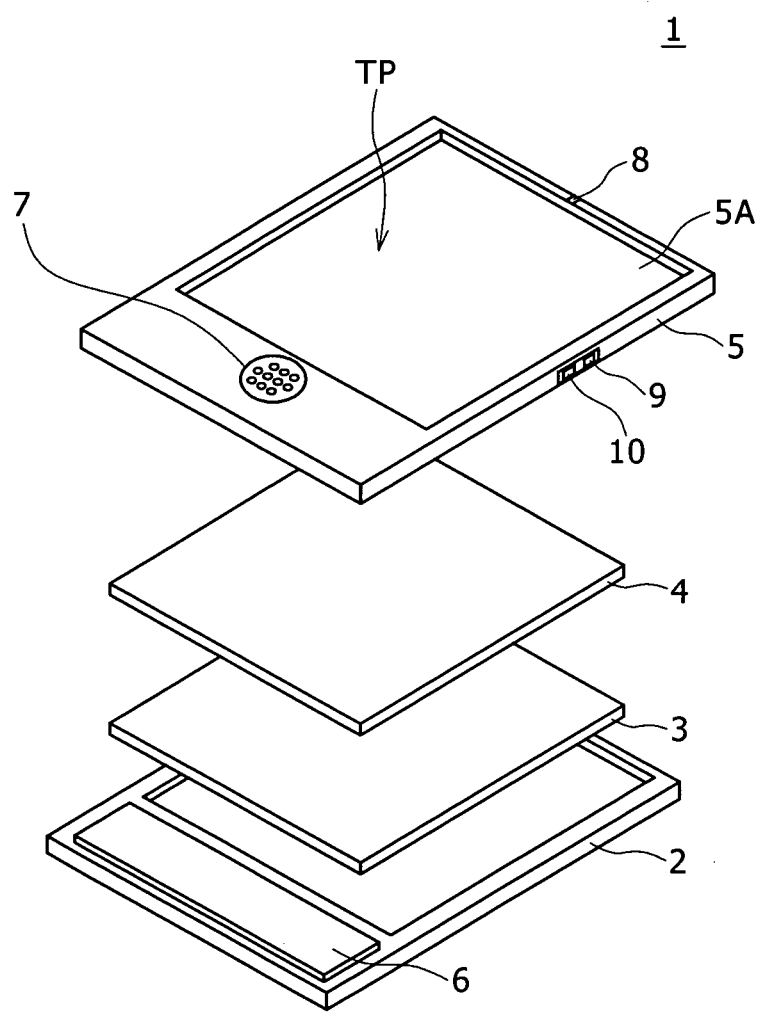
FIG. 1 is a diagrammatic perspective view showing the structure of a mobile PC in an embodiment of the present invention.

Now, an embodiment of the present invention will be described in detail below referring to the drawings.

(1) Structure of Mobile PC

In FIG. 1, numeral 1 denotes a small mobile-type personal computer (hereinafter referred to as mobile PC) as an information apparatus according to an embodiment of the present invention, being substantially rectangular in overall shape and having reduced size and weight.

The mobile PC 1 has a body casing 2, a display unit 3 including, for example, a liquid crystal display, a touch sensor 4 and a cover casing 5, which are in a stacked state.

In practice, the mobile PC 1 has a structure in which an electronic circuit unit 6 including a control unit having a CPU (central processing unit), a storage unit having, for example, a semiconductor memory, and a battery and the like is contained in the body casing 2, and the display unit 3 is contained adjacently to the electronic circuit unit 6. In addition, onto a display surface of the display unit 3, the touch sensor 4 being the same in size therewith is adhered.

Incidentally, the touch sensor 4 is not particularly limited in regard of the system thereof insofar as it can recognize touch operations performed by a user's fingertip, based on a resistive film system, an analog capacitance system or the like.

In the mobile PC 1, the cover casing 5 having a window 5A provided with a transparent cover substantially the same in size as the display unit 3 and the touch sensor 4 is attached to the body casing 2, in which the display unit 3 and the touch sensor 4 are stacked, in such a manner as to cover these components as a whole. This structure ensures that the window 5A, the touch sensor 4 and the display unit 3 as a whole can function as a touch panel TP.

Besides, the mobile PC 1 has incorporated therein a microphone 7 and a speaker 8 located respectively on both sides of the window 5A of the cover casing 5. The microphone 7 and the speaker 8 are electrically connected to the electronic circuit unit 6 of the body casing 2, so that the mobile PC 1 can function also as a telephone set.

Further, the mobile PC 1 is provided, at a right side surface of the cover casing 5, with an ON switch 9 and an OFF switch 10 which are slightly projecting from the right side surface. This ensures that various instructions such as decision and cancellation can be inputted not only through the touch panel TP but also through the ON switch 9 and the OFF switch 10.

(2) Circuit Configuration of Mobile PC

Figure 2:
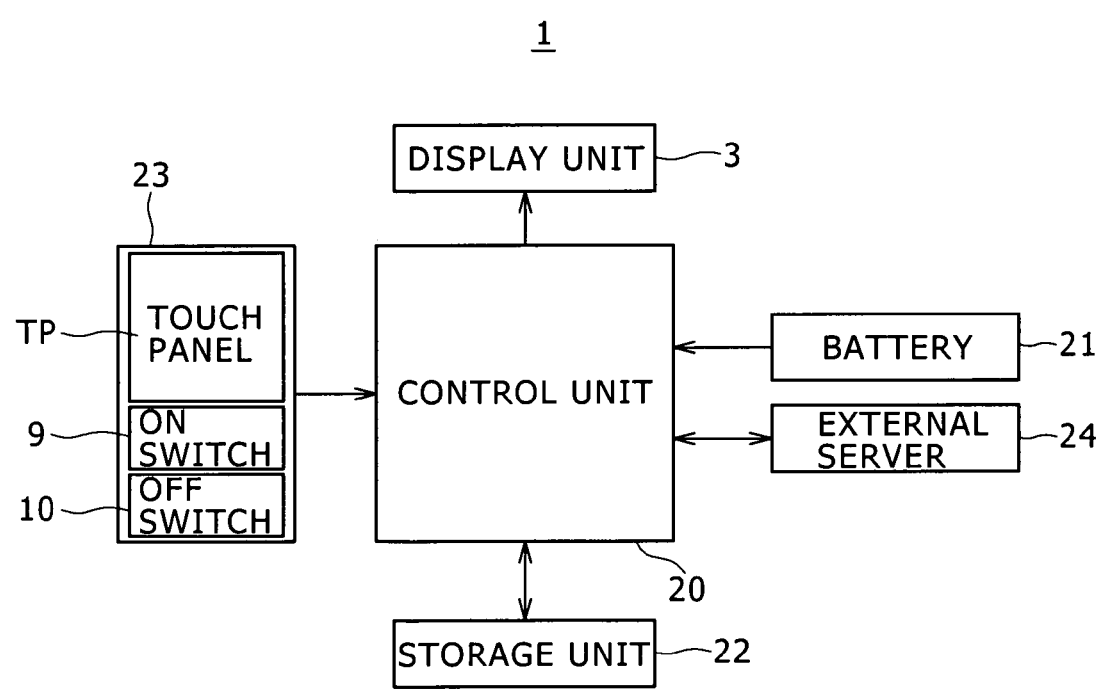
FIG. 2 is a diagrammatic block diagram showing the circuit configuration of the mobile PC.

As shown in FIG. 2, the mobile PC 1 is operated based on electric power supplied from a battery 21. The control unit 20 including the CPU supervises and controls the whole part of the mobile PC 1 according to a basic program read from the storage unit 22 including a semiconductor memory or the like, and various functions can be realized according to various application programs read from the storage unit 22.

In practice, in the mobile PC 1, operation elements as objects of selection, such as icons and link buttons, which are present in a screen displayed on the display unit 3 can be selected and decided through touch operations performed by a user's fingertip by way of the touch panel TP in the input unit 23.

Besides, in the mobile PC 1, after the operation element such as icons and link buttons is selected by the user, the operation element can be decided or decision on the operation element can be cancelled, according to a depressing operation on the ON switch 9 or the OFF switch 10.

Furthermore, the mobile PC 1 can be wired to or wirelessly connected to an external server 24. This ensures that various contents can be downloaded from the external server 24, and that a data file or the like produced on the mobile PC 1 can be transmitted to the external server 24 to thereby use the external server 24 as a data storage.

(3) Features of Pointer

Now, the features of a pointer used at the display unit 3 of the mobile PC 1 will be described. As shown in FIG. 3A, the mobile PC 1 is so configured that when the user grips the mobile PC 1, for example, with his or her right hand and a touch operation on the touch panel TP is conducted by the fingertip of the user's thumb, the control unit 20 sets a circular area (indicated by broken line) AR with a predetermined diameter, correspondingly to the point of contact by the fingertip of the thumb.

Then, as shown in FIG. 3B, the control unit 20 of the mobile PC 1 generates a pointer P1 having a pointed shape in which an isosceles-triangular tip part H1 is integrally merged into the circular area AR containing the contact point, and the control unit 20 displays the pointer P1 on the display unit 3.

The pointer P1 is characterized by its pointed shape having a predetermined length such that the position of the fingertip of the thumb on the touch panel TP and a link button L1 displayed on the display unit 3 can be thereby connected to each other. Thus, the control unit 20 of the mobile PC 1 can give the user an impression as if the tip part H1 of the pointer P1 were extended from the user's thumb.

Therefore, the control unit 20 of the mobile PC 1 is so designed that the link button L1 can be selected by the tip part H1 of the pointer P1 presented as if it were extended from the fingertip of the user's thumb, instead of directly selecting the link button L1 through the point of contact by the fingertip of the thumb.

Figure 4:
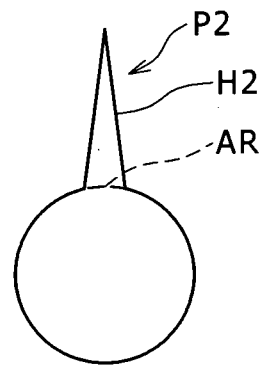
FIG. 4 is a diagrammatic view showing the shape of a pointer having another form.

Incidentally, in the mobile PC 1, the shape of the pointer P1 is not limited to the above-mentioned one. For example, like a pointer P2 shown in FIG. 4, the pointer may have a pointed shape designed as if a needle-like tip part H2 were integrally merged into a circular area AR. What is essential here is that the pointer should have a tip part with a pointed shape that permits easy selection of the operation element such as the link button L1.

Besides, in the mobile PC 1, the finger to be used for the touch operation is not limited to the thumb, and may be any finger that permits the user to perform the touch operation easily, for example, the index finger, the middle finger, the annular finger or the little finger. Furthermore, the pointer P1 can be presented also in response to a touch operation conducted with a touch pen or the like other than the user's finger.

(4) Actions of Pointer

Now, actions (motions) of the pointer P1 will be described. As actions of the pointer P1, there are two actions. One is a normal action in which the tip part H1 of the pointer P1 changes according to the position of a user's fingertip relative to the touch panel TP of the display unit 3. The other is an attraction action in which the tip part H1 of the pointer P1 acts (moves) as if it were automatically attracted (or sucked) onto the link button L1 (displayed on the display unit 3) when approaching the link button L1.

(4-1) Normal Action

Figure 5:
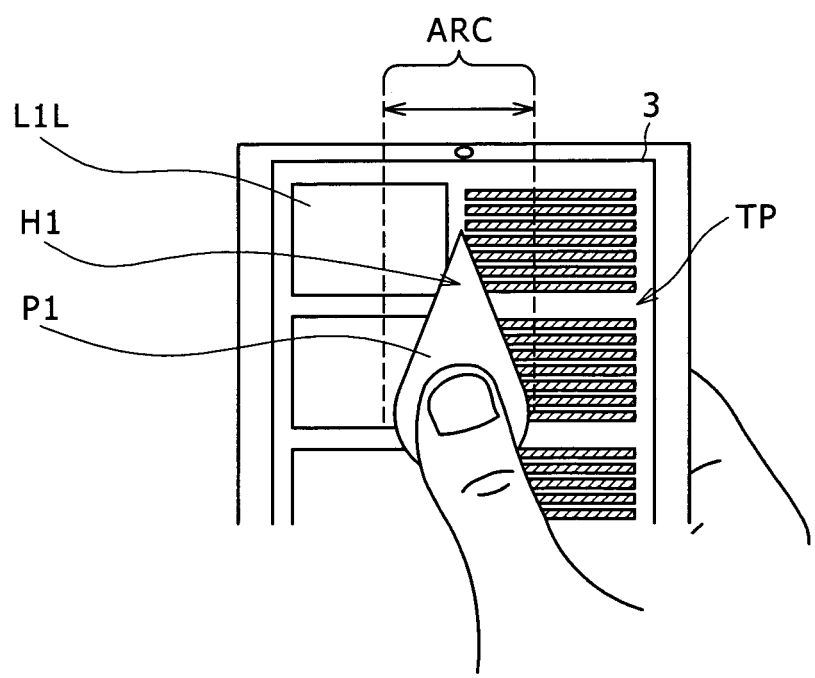
FIG. 5 is a diagrammatic view for illustrating a normal action of a pointer, (1)

As shown in FIG. 5, when the position of the user's fingertip relative to the touch panel TP of the display unit 3 is present in a central area ARC, i.e., at or around a substantially central position in the left-right direction of the touch panel TP, the control unit 20 of the mobile PC 1 performs such a control as to direct the tip part H1 of the pointer P1 vertically upwards.

Figure 6:
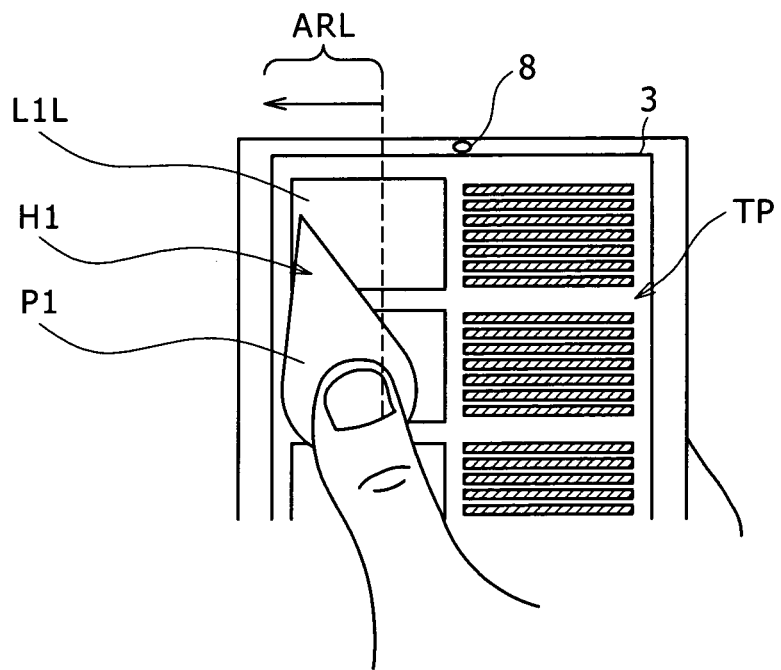
FIG. 6 is a diagrammatic view for illustrating the normal action of the pointer, (2)

In addition, as shown in FIG. 6, when the position of the user's fingertip relative to the touch panel TP of the display unit 3 is moved from the central area ARC into a left-side area ARL including the vicinity of a left-side edge of the touch panel TP, the control unit 20 of the mobile PC 1 performs such a control as to orient the tip part H1 of the pointer P1 to an upper left side, from the vertical upward direction.

Figure 7:
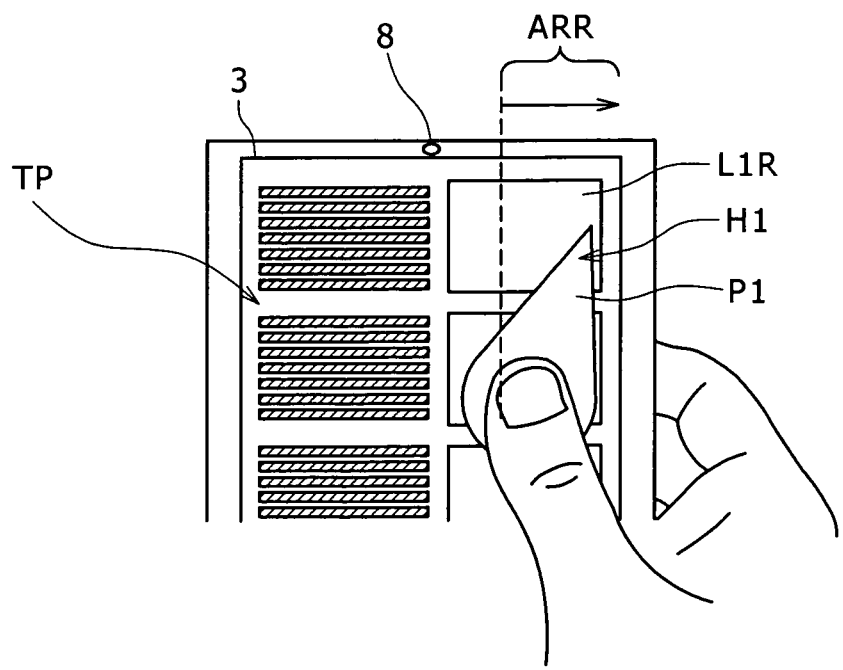
FIG. 7 is a diagrammatic view for illustrating the normal action of the pointer, (3)

Further, as shown in FIG. 7, when the position of the user's fingertip relative to the touch panel TP of the display unit 3 is moved from the central area ARC into a right-side area ARR including the vicinity of a right-side edge of the touch panel TP, the control unit 20 of the mobile PC 1 performs such a control as to orient the tip part H1 of the pointer P1 to an upper right side, from the vertical upward direction.

Thus, in all of the case where the position of the user's fingertip relative to the touch panel TP of the display unit 3 is moved from the central area ARC into the left-side area ARL or the right-side area ARR, the case where the position is moved from the left-side area ARL through the central area ARC into the right-side area ARR, and the case where the position is moved from the right-side area ARR through the central area ARC into the left-side area ARL, the control unit 20 of the mobile PC 1 can move the tip part H1 of the pointer P1 so as to orient the tip part H1 vertically upward, to the upper left side and to the upper right side, respectively, in the manner of a pendulum, according to the movement of the fingertip.

This ensures that the control unit 20 of the mobile PC 1 can permit a link button L1L present in the left-side area ARL of the display unit 3 or a link ribbon L1R present in the right-side area ARR to be easily selected by the tip part H1 of the pointer P1 moved in the pendulum-like manner, without needing the user's fingertip to approach the vicinity of the left-side edge or the vicinity of the right-side edge.

Figure 8:
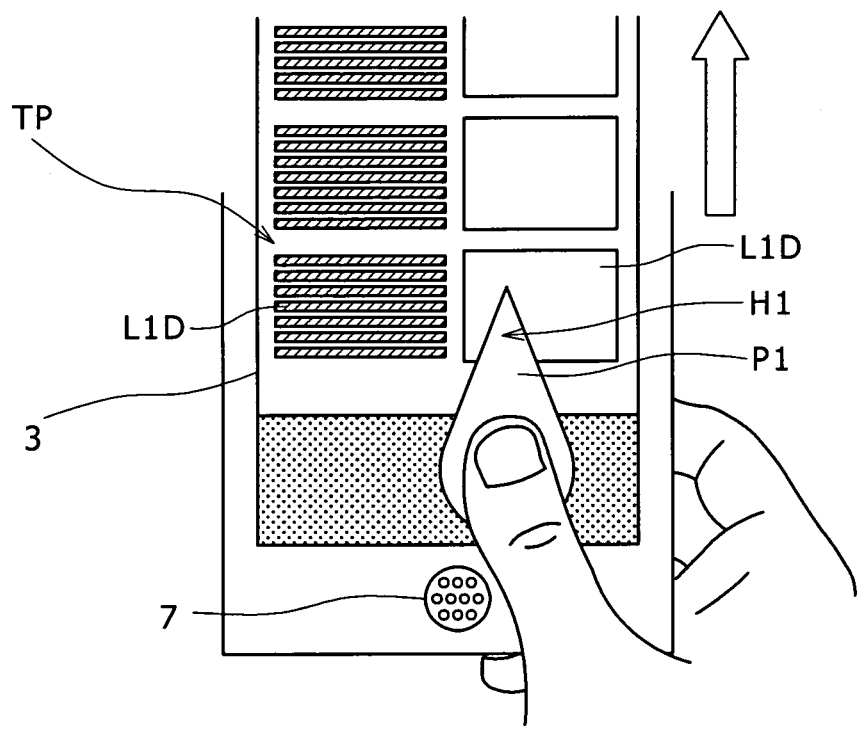
FIG. 8 is a diagrammatic view for illustrating an automatic scroll in the case where the position of a finger is in a lower area.

Meanwhile, when the position of the user's fingertip relative to the touch panel TP of the display unit 3 is on the lowermost side on the display unit 3 and an image displayed on the display unit 3 is located at the lowermost end, the upward orientation (angular position) of the tip part H1 of the pointer P1 makes it difficult to select a link button L1D located at the lowermost end. Taking this into consideration, as shown in FIG. 8, the control unit 20 of the mobile PC 1 is designed to perform a downward automatic scroll for selection of a lower area, by moving the entire part of the images on the display unit 3 upward in the direction of the arrow.

Incidentally, it is unnecessary for the control unit 20 of the mobile PC 1 to perform a horizontal automatic scroll for selection of either of left and right end parts of image, since the control unit 20 is designed to ensure that the link button L1L present in the left-side area ARL of the display unit 3 and the link button L1R present in the right-side area ARR can be selected by the tip part H1 of the pointer P1 moved in the pendulum-like manner.

(4-2) Attraction Action

Figure 9:
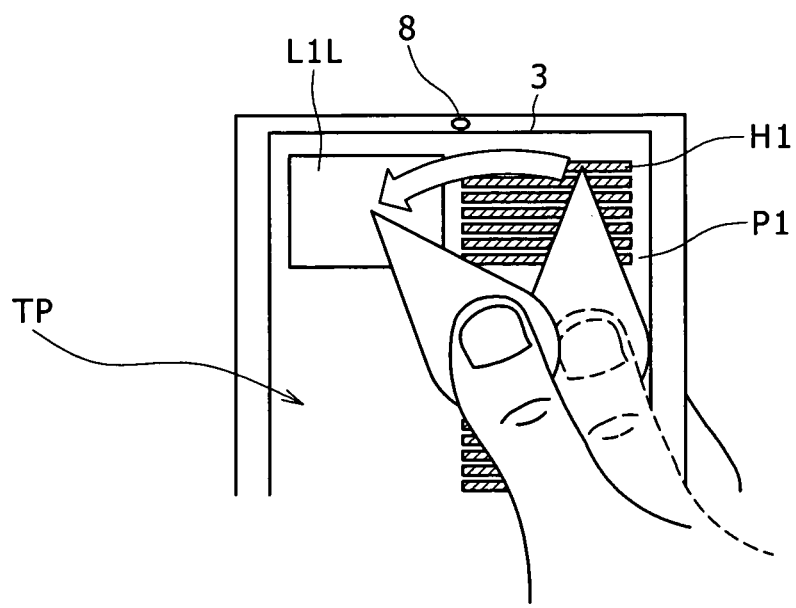
FIG. 9 is a diagrammatic view for illustrating an attraction action of the pointer, (1)

As shown in FIG. 9, when the position of the user's fingertip relative to the touch panel TP is initially separate from the link button L1L located on the left side on the screen, the control unit 20 of the mobile PC 1 is directing the tip part H1 of the pointer P1 upward.

Thereafter, when the position of the fingertip approaches the link button L1L and gets in a predetermined range from the link button L1L (namely, when the distance between the fingertip and the link button L1L is reduced to or below a predetermined value), the control unit 20 of the mobile PC 1 deflects the orientation (angular position) of the tip part H1 of the pointer P1 to the left side so that the tip part H1 points at (selects) the link button L1L, as if the tip part H1 were attracted (or sucked) onto the link button L1L.

Figure 10:
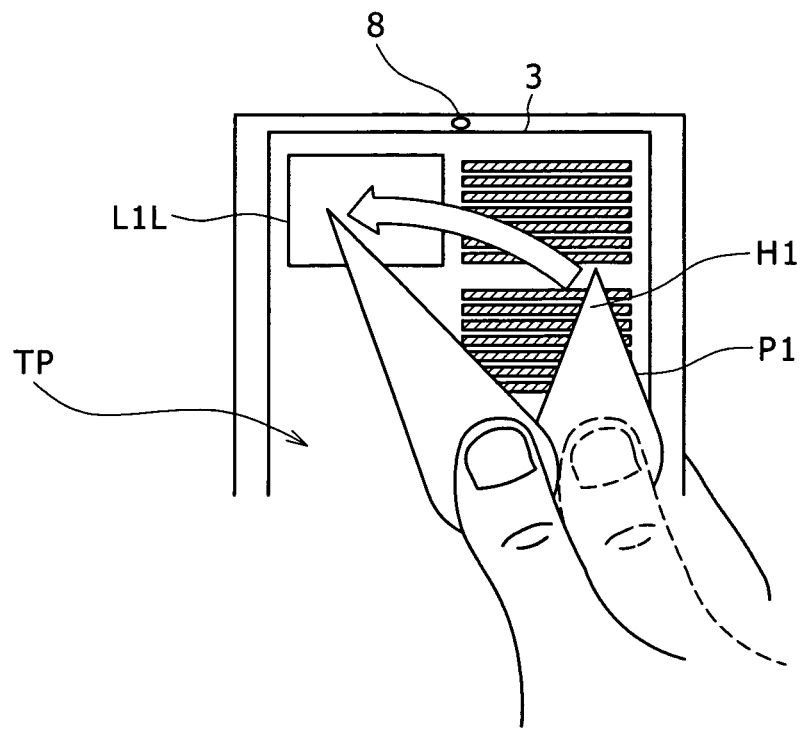
FIG. 10 is a diagrammatic view for illustrating the attraction action of the pointer, (2)

Besides, as shown in FIG. 10, when the position of the user's fingertip relative to the touch panel TP is initially remote from the link button L1L located on the left side on the screen of the display unit 3, the control unit 20 of the mobile PC 1 is directing the tip part H1 of the pointer P1 vertically upwards.

Thereafter, when the position of the fingertip approaches the link button L1L and gets in a predetermined range from the link button L1L (namely, when the distance between the fingertip and the link button L1L is reduced to or below a predetermined value), the control unit 20 of the mobile PC 1 deflects the orientation of the tip part H1 of the pointer P1 to the left side while extending (enlarging the length of) the tip part H1 so that the tip part H1 points at (selects) the link button L1L, as if the tip part H1 were attracted (sucked) onto the link button L1L.

Figure 11:
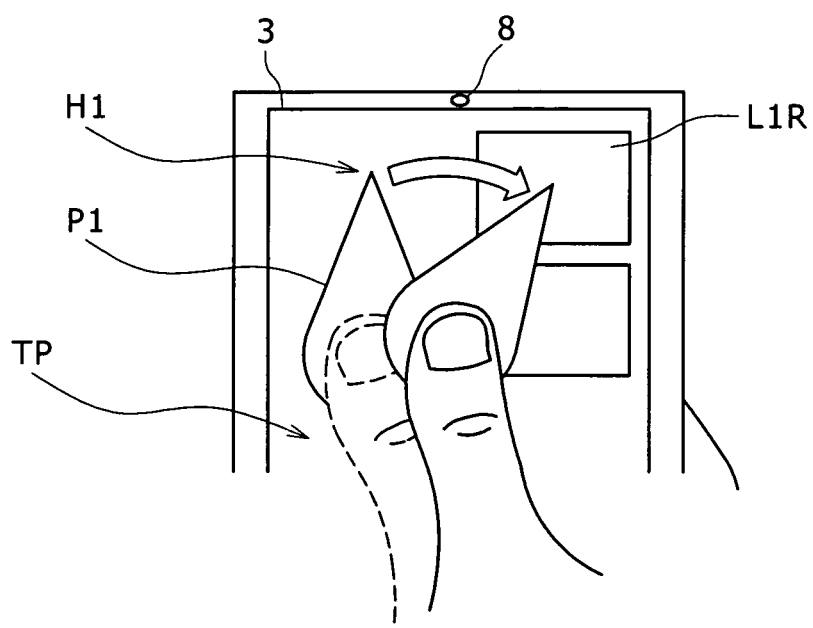
FIG. 11 is a diagrammatic view for illustrating the attraction action of the pointer, (3)

Furthermore, as shown in FIG. 11, when the position of the user's fingertip relative to the touch panel TP is initially remote from the link button L1R located on the right side on the screen of the display unit 3, the control unit 20 of the mobile PC 1 is directing the tip part H1 of the pointer P1 vertically upwards.

Thereafter, when the position of the fingertip approaches the link button L1R and gets in a predetermined range from the link button L1R (namely, when the distance between the fingertip and the link button L1R is reduced to or below a predetermined value), the control unit 20 of the mobile PC 1 deflects the orientation of the tip part H1 of the pointer P1 to the right side so that the tip part H1 points at (selects) the link button L1R, as if the tip part H1 were attracted (sucked) onto the link button L1R.

Thus, when the position of the user's fingertip relative to the touch panel TP is remote from the link button L1L located on the left side on the screen of the display unit 3 or the link ribbon L1R located on the right side on the screen, the control unit 20 of the mobile PC 1 is normally directing the tip part H1 of the pointer P1 vertically upwards.

However, when the position of the fingertip approaches and gets in a predetermined range from the link button L1L or L1R (namely, when the distance between the fingertip and the link button L1L or L1R is reduced to or below a predetermined value), the control unit 20 of the mobile PC 1 extends (enlarges the length of) the tip part H1 or deflects the orientation of the tip part H1 so that the tip part H1 points at (selects) the link button L1L or L1R, as if it were attracted (sucked) onto the link button L1L or L1R.

In this manner, when the position of the fingertip has approached the link button L1L or L1R, the control unit 20 of the mobile PC 1 performs such a control that the tip part H1 of the pointer P1 is automatically attracted onto the link button L1L or L1R.

Consequently, even where the link ribbon L1L or L1R as an object of selection is present on the left side or right side in the image displayed on the display unit 3, the control unit 20 of the mobile PC1 permits the link button L1L or L1R to be easily selected through the pointer P1 capable of being attracted onto the link ribbon L1L or L1R, without any horizontal automatic scroll to move the frame of the display unit 3 leftwards or rightwards for selection of either of left and right end parts of image.

(5) Pointing Mode and Scroll Mode

In addition, the mobile PC 1 is provided with two modes, i.e., a pointing mode and a scroll mode. In the pointing mode, upon a touch operation on the touch panel TP of the display unit 3 by a fingertip, the pointer P1 is presented so as to enable selection of the operation elements such as the link button L1L or L1R. In the scroll mode, when the fingertip in the state of touching the touch panel TP is moved in the vertical direction at a velocity of not less than a predetermined reference value, the image being displayed on the display unit 3 is scrolled vertically.

(5-1) Pointing Mode

Figure 12:
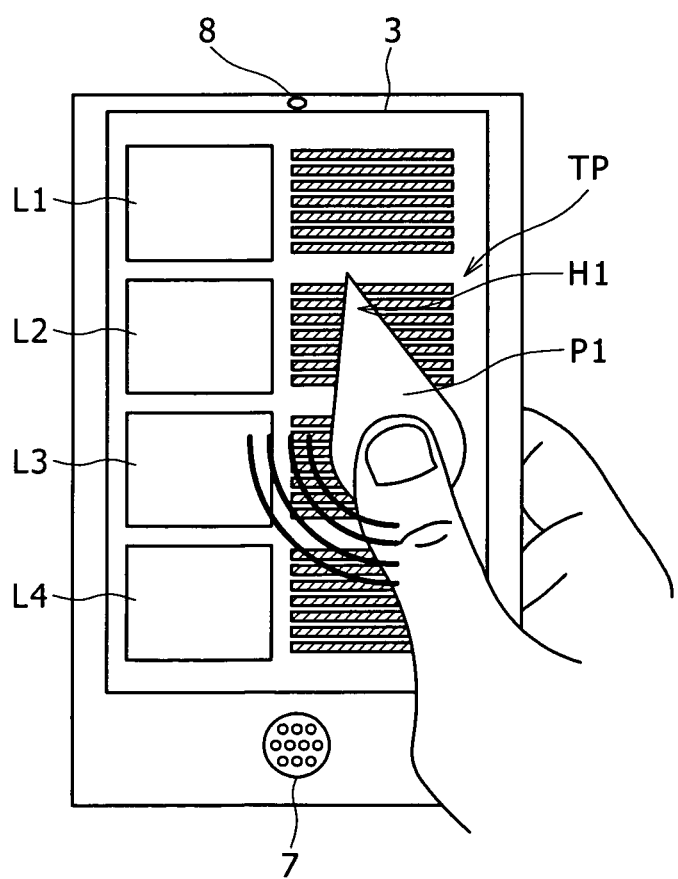
FIG. 12 is a diagrammatic view for illustrating a pointing mode.

As shown in FIG. 12, when the control unit 20 has recognized a touch operation on the touch panel TP of the display unit 3 by a user's fingertip, the mobile PC 1 is set into the pointing mode in which the pointer P1 is presented to enable selection of any of link buttons L1 to L4 in the image being displayed.

In practice, when it is recognized by the control unit 20 in the mobile PC 1 that the fingertip touching the touch panel TP of the display unit 3 has remained unmoved for not less than a predetermined period of time, the control unit 20 effects a transition into the pointing mode in which the pointer P1 is presented on the display unit 3 so as to enable selection of any of the link buttons L1 to L4 in the image being displayed.

Specifically, the control unit 20 of the mobile PC 1 is designed to ensure that any of the link button L1 to L4 present in the image being displayed on the display unit 3 can be easily selected by moving the tip part H1 of the pointer P1, according to the normal action or the attraction action preset in the pointing mode.

(5-2) Scroll Mode

Figure 13:
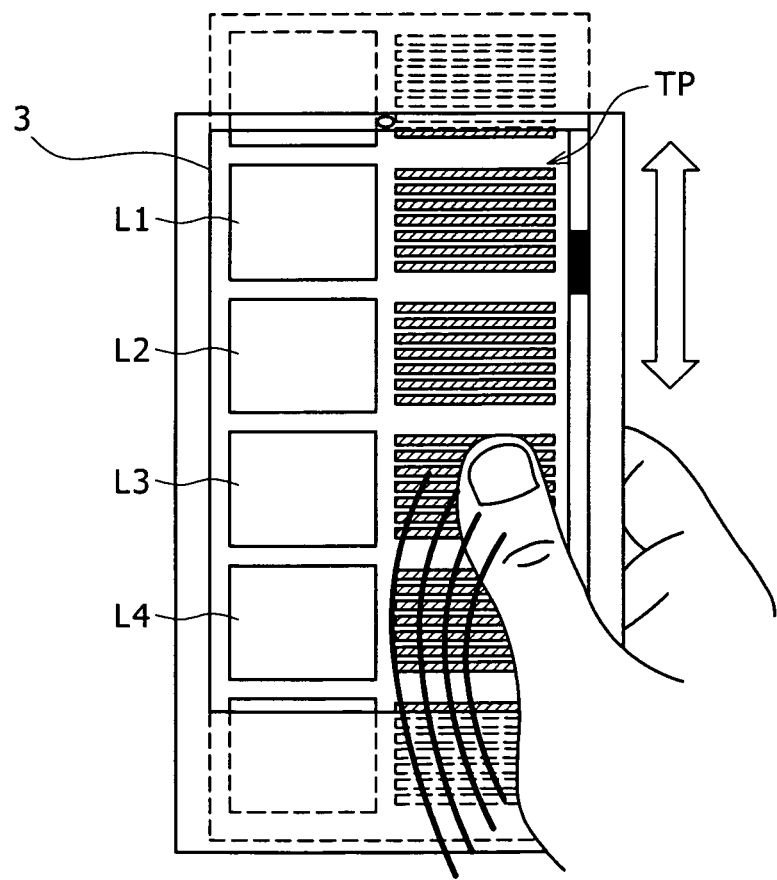
FIG. 13 is a diagrammatic view showing a vertical scroll in a scroll mode.

On the other hand, as shown in FIG. 13, when it is recognized by the control unit 20 that the finger point touching the touch panel TP of the display unit 3 has moved in the vertical direction within a predetermined period of time from the moment of the touch operation, the mobile PC 1 is set into the scroll mode in which the image being displayed on the display unit 3 is scrolled in the vertical direction according to the movement of the fingertip.

In practice, when it is recognized by the control unit in the mobile PC 1 that the fingertip touching the touch panel TP of the display unit 3 has moved in the vertical direction within the predetermined period of time from the moment of the touch, the control unit 20 effects a transition into the scroll mode. Thereafter, when it is recognized that the fingertip has remained unmoved for not less than a predetermined period of time, the control unit 20 presents the pointer P1 to put the mobile PC 1 in the pointing mode (FIG. 12) then on.

Incidentally, when it is recognized by the control unit 20 of the mobile PC 1 that a predetermined period of time has passed from the moment of separation of the user's fingertip from the touch panel TP of the display unit 3 during the pointing mode, the control unit 20 effects an automatic transition into the scroll mode so that, upon a subsequent touch operation by the user's fingertip, the image being displayed on the display unit 3 can immediately be scrolled.

Figure 14:
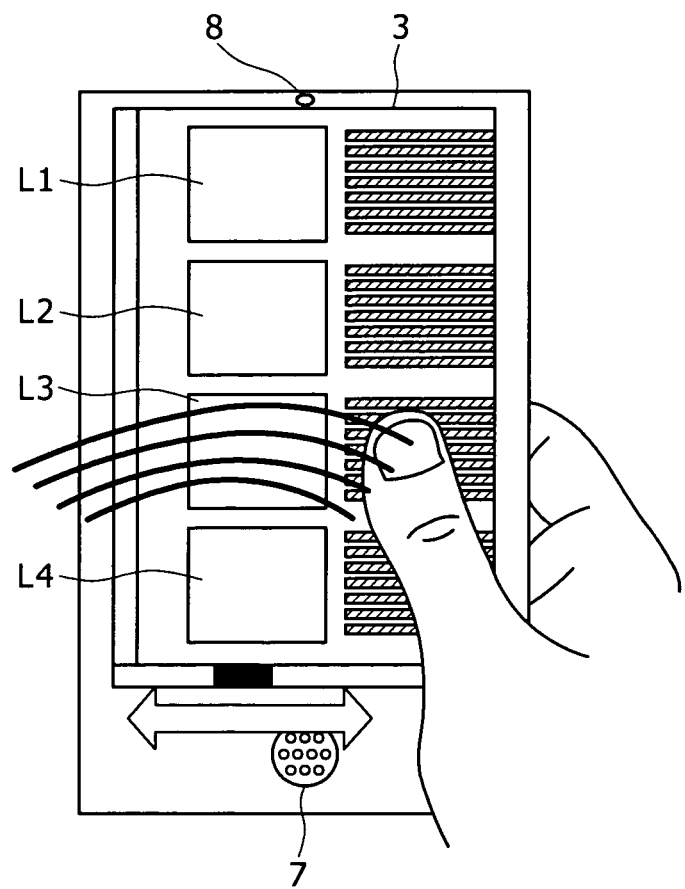
FIG. 14 is a diagrammatic view showing a horizontal (sideways) scroll in the scroll mode.

Incidentally, as shown in FIG. 14, the control unit 20 of the mobile PC 1 is designed to be capable of effecting not only the vertical scroll but also horizontal scroll. Specifically, when it is recognized by the control unit 20 that the fingertip has moved horizontally within a predetermined period of time from the moment of its touch on the touch panel TP of the display unit 3, the control unit 20 effects a transition into the scroll mode for horizontally scrolling the image being displayed on the display unit 3 in accordance with the movement of the fingertip.

In practice, the control unit 20 of the mobile PC 1 effects a transition into the scroll mode upon recognizing that the fingertip touching the touch panel TP of the display unit 3 has moved horizontally within the predetermined period of time from the moment of touching. Thereafter, upon recognizing that a predetermined period of time has passed without any movement of the fingertip, the control unit 20 presents the pointer P1 to put the mobile PC 1 in the pointing mode then on.

In this case, also, when it is recognized by the control unit 20 of the mobile PC 1 that a predetermined period of time has passed from the moment of separation of the user's fingertip from the touch panel TP of the display unit 3 during the pointing mode, the control unit 20 effects an automatic transition into the scroll mode so that, upon a subsequent touch operation by the user's fingertip, the image being displayed on the display unit 3 can immediately be scrolled.

Incidentally, when it is recognized by the control unit 20 in the mobile PC 1 that the user's fingertip touching the touch panel TP of the display unit 3 has moved vertically or horizontally within a predetermined period of time from the moment of the touch, the control unit 20 effects a transition to the scroll mode in which the image being displayed on the display unit 3 is scrolled vertically or horizontally according to the movement of the fingertip.

However, this is not limitative. The control unit 20 of the mobile PC 1 may be so designed as to effect the transition to the scroll mode upon recognizing that the moving velocity of the fingertip on touching the touch panel TP of the display unit 3 is greater than a predetermined reference value.

(6) Input Procedures Using Pointer

Now, an input procedure made on the mobile PC 1 using the pointer P1 will be described below. In the following, the case where an input procedure using the normal action of the pointer P1 is selected by the user and the case where an input procedure using the normal action and the attraction action of the pointer P1 in combination is selected by the user will be respectively described separately.

(6-1) Input Procedure Using Normal Action

Figure 15:
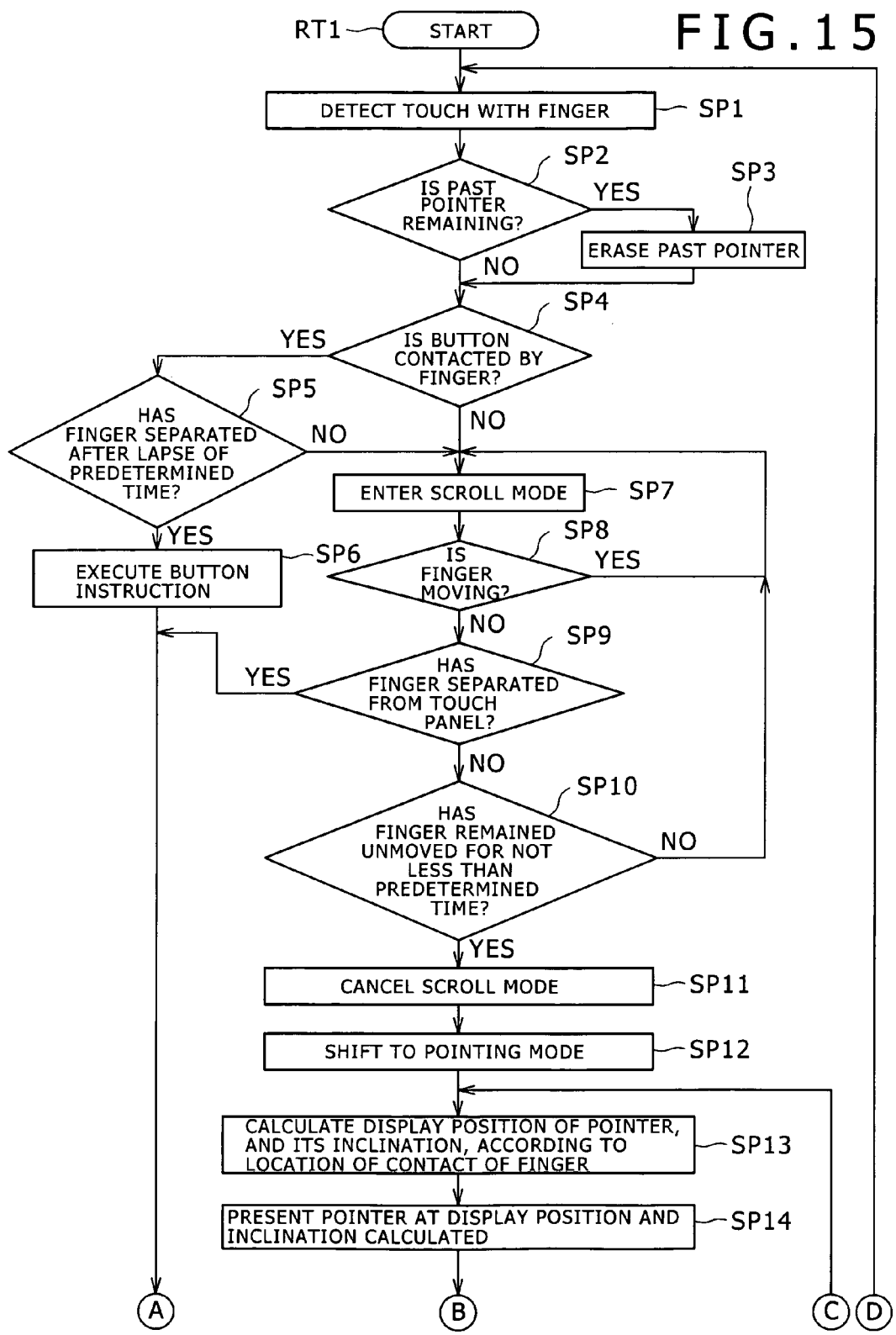
FIG. 15 is a flowchart showing an input procedure using a normal action, (1)
Figure 16:
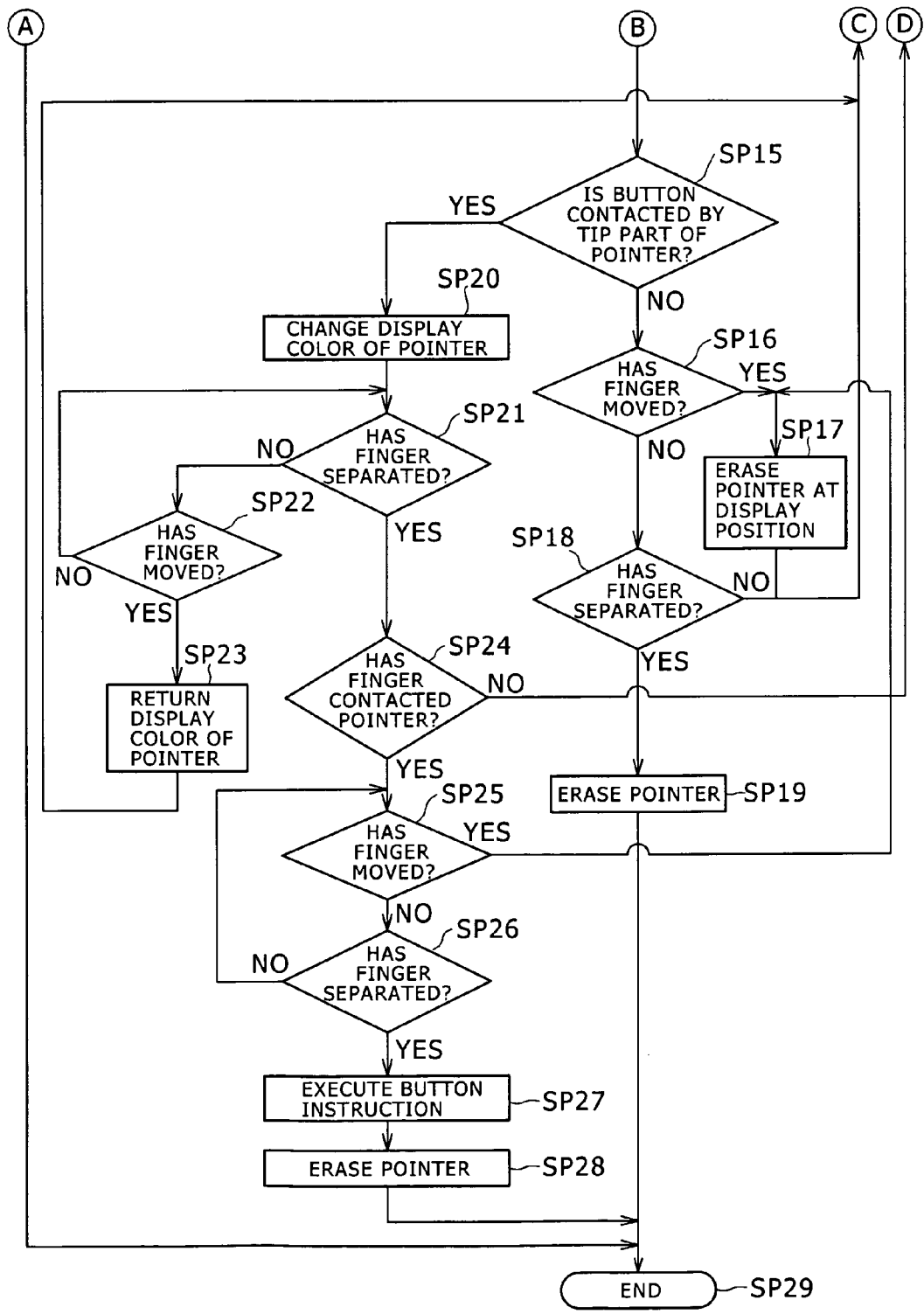
FIG. 16 is a flowchart showing the input procedure using the normal action, (2)

As shown in FIGS. 15 and 16, the control unit 20 of the mobile PC 1, according to a pointer generating program prepared as an application program, commences a routine RT1 through a STRT step thereof, and moves to the next step SP1. When it is detected here that the touch panel TP of the display unit 3 is touched by a user's fingertip, the control unit 20 enters the next step SP2.

In step SP2, the control unit 20 of the mobile PC 1 determines whether or not a pointer P1 presented on the display unit 3 in the past is remaining unerased. When the determination result is affirmative (YES), the control unit 20 enters the next step SP3, where it once erases the pointer P1 presented in the past, and then enters the next step SP4.

On the other hand, when the result of determination in step SP2 is negative (NO), it means that the touch panel TP was touched by the finger for the first time and that the pointer P1 presented in the past is not remaining on the display unit 3. In this instance, the control unit 20 of the mobile PC 1 moves to the next step SP4 immediately, i.e., without executing any operation.

In step SP4, the control unit 20 of the mobile PC 1 determines whether or not the user's fingertip is in direct contact with any of the link buttons L1 to L4 (FIGS. 12 to 14) present as operation elements in the image displayed on the display unit 3. This determination is made based on the difference between coordinate values on the display unit 3 of the link buttons L1 to L4 and the coordinate values on the display unit 3 of the position of contact by the user's fingertip.

When the determination result here is affirmative, it shows that one of the link buttons L1 to L4 as operation elements to be selected, for example, the link button L1, is touched by the user's fingertip directly, instead of through the pointer P1. In this instance, the control unit 20 in the mobile PC 1 moves to the next step SP5.

On the other hand, when the result of determination in step SP4 is negative, it means that none of the link buttons L1 to L4 (FIGS. 12 to 14) is touched directly by the user's fingertip. In this case, the control unit 20 enters the next step SP7.

In step SP5, the control unit 20 of the mobile PC 1 determines whether or not the user's fingertip having been directly touching the link button L1 has separated therefrom after the lapse of a predetermined period of time (e.g., 1.5 sec).

If an affirmative result is obtained upon determination here, it means that the user's fingertip in direct touch on the link button L1 has separated therefrom after the lapse of the predetermined period of time (e.g., 1.5 sec), i.e., the link button L1 has been determinably selected by the user. In this instance, the control unit 20 of the mobile PC 1 enters the next step SP6.

In step SP6, the control unit 20 of the mobile PC 1 executes a predetermined button instruction allocated to the link button L1, and then jumps to step SP29, thereby terminating the process.

On the other hand, if the result of determination in step SP5 is negative, it means that the user's fingertip in direct touch on one of the link buttons L1 to L4 has separated before the lapse of the predetermined period of time (e.g., 1.5 sec), i.e., one of the link buttons L1 to L4 has merely been momentarily touched by the fingertip, rather than being determinably selected. In this case, the control unit 20 of the mobile PC 1 moves to step SP 7.

In step SP7, based on the fact that none of the link buttons L1 to L4 is being directly touched by the user's fingertip, the control unit 20 of the mobile PC 1 determines that the user's fingertip has probably moved vertically or horizontally within a predetermined period of time from the moment of touching, and effects a transition into the scroll mode. As shown in FIGS. 13 and 14, in the scroll mode, the image displayed on the display unit 3 is scrolled by the control unit 20 vertically or horizontally according to the moving direction (vertical direction or horizontal direction) of the fingertip. After that, the control unit 20 enters the next step SP8.

In step SP8, the control unit 20 of the mobile PC 1 determines whether or not the user's fingertip is moving on the touch panel TP after the transition into the scroll mode. When the fingertip is moving, an affirmative determination result is obtained, and the control unit 20 moves back again to step SP7, thereby continuing the scrolling of image in the scroll mode.

On the other hand, when the result of determination in step SP8 is negative, it means that the user's fingertip is not moving notwithstanding the transition into the scroll mode has been made. In this instance, the control unit 20 of the mobile PC 1 does not scroll the image but moves to the next step SP9.

In step SP9, the control unit 20 in the mobile PC 1 determines whether or not the user's fingertip has separated from the touch panel TP. When an affirmative result is obtained here, it shows that the user's fingertip has separated from the touch panel TP without selecting any of the link buttons L1 to L4 notwithstanding the mobile PC 1 has been in the scroll mode. In this case, the control unit 20 of the mobile PC 1 jumps to step SP29, thereby terminating the process.

On the other hand, if the result of determination in step SP9 is negative, it means that the user's fingertip is not moving and yet it remains touching the touch panel TP. In this case, the control unit 20 of the mobile PC 1 enters the next step SP10.

In step SP10, the control unit 20 of the mobile PC 1 determines whether or not the user's fingertip touching the touch panel TP has remained unmoved (without separating) for not less than a predetermined period of time.

When a negative determination result is obtained here, it shows that the user's fingertip has again moved before the lapse of the predetermined period of time, in other words, the scroll instruction has been given again. In this case, the control unit 20 of the mobile PC 1 restarts the scrolling of image, by repeating step SP7 and the subsequent steps once again.

On the other hand, when the result of determination in step SP10 is affirmative, it means that the user's fingertip touching the touch panel TP has remained unmoved (without separating), i.e., the user's finger has been standstill, for the predetermined period of time. In this instance, the control unit 20 of the mobile PC 1 enters the next step SP11.

In step SP11, the control unit 20 of the mobile PC 1 determines that the user does not have an intent to input a scroll instruction. Based on the judgment, the control unit 20 enters the next step SP12 to make a shift to the pointing mode, and thereafter enters the subsequent step SP13.

In step S13, the control unit 20 of the mobile PC 1, in the case where the normal action is set to the pointer P1 by default, calculates the display position (relative to the display unit 3) of the pointer P1 and the inclination of the tip part H1 of the pointer P1, according to the location on the touch panel TP where the touch with the user's fingertip is being made. Upon the calculation, the control unit 20 enters the next step SP14.

In step SP14, the control unit 20 of the mobile PC 1 displays the pointer P1 of the tip part H1 having the inclination calculated in step SP13, at the display position on the display unit 3 calculated in step SP13, and in a predetermined display color (e.g., blue), thereby presenting the pointer P1 in such a form as to appear as if it were extending from the user's fingertip. Upon presenting the pointer P1, the control unit 20 enters the next step SP15.

In this case, as shown in FIGS. 5 to 7, the control unit 20 of the mobile PC 1 changes the inclination of the tip part H1 of the pointer P1 in a pendulum-like manner, according to the position of the fingertip relative to the touch panel TP of the display unit 3. Therefore, the control unit 20 can permit one of the link buttons L1 to L4 which is desired by the user to be easily selected by use of the pointer P1.

In step S15, the control unit 20 of the mobile PC 1 determines whether or not the tip part H1 of the pointer P1 presented on the display unit 3 is in contact with the link button L1, for example. When the determination result is negative, the control unit 20 enters the next step SP16.

In step SP16, the control unit 20 of the mobile PC 1 determines whether or not the user's fingertip has moved on the touch panel TP in the condition where the tip part H1 of the pointer P1 has been out of contact with the link button L1.

When an affirmative determination result is obtained here, it shows that the pointer P1 is continuing movement on the touch panel TP due to movement of the user's fingertip. In this case, the control unit 20 of the mobile PC 1 moves to the next step SP17.

In step SP17, the control unit 20 of the mobile PC 1 erases the pointer P1 at the display position where the pointer P1 has been once presented in step SP14 attendantly on the movement of the fingertip, and then goes back again to step SP13, to repeat the above-mentioned processing.

On the other hand, if the result of determination in step SP16 is negative, it means a condition where the tip part H1 of the pointer P1 is not in contact with any of the link buttons L1 to L4 and where the pointer P1 is not moving on the touch panel TP. In this instance, the control unit 20 of the mobile PC 1 enters the next step SP18.

In step SP18, the control unit 20 of the mobile PC 1 determines whether or not the user's fingertip has separated from the touch panel TP in the just-mentioned condition. When the determination result is negative, the control unit 20 repeats the processing of step SP13 and the subsequent steps, thereby continuously presenting the pointer P1.

On the other hand, when the result of determination in step SP18 is affirmative, it indicates that the user's fingertip has separated from the touch panel TP in the condition where the tip part H1 of the pointer P1 is not in contact with any of the link buttons L1 to L4. In this instance, the control unit 20 of the mobile PC 1 enters the next step SP19.

In step SP19, in view of the fact that the user's fingertip has separated from the touch panel TP, the control unit 20 of the mobile PC 1 erases the pointer P1, thereby terminating the pointing mode, and goes to step SP29, thereby terminating the process.

On the other hand, when the result of determination in step SP15 is affirmative, it indicates that the link button L1, for example, is currently selected by the pointer P1. In this case, the control unit 20 of the mobile PC 1 moves to step SP20.

In step SP20, the control unit 20 of the mobile PC 1 changes the display color of the pointer P1, for example, from the initial blue (non-selecting) to red (selecting), thereby visually informing the user that the link button L1 is currently selected by the pointer P1. Then, the control unit 20 enters the next step SP21.

In step SP21, the control unit 20 of the mobile PC 1 determines whether or not the user's fingertip has separated from the touch panel TP during selection of the link button L1 by the pointer P1. When the result of determination is negative, the control unit 20 moves to the next step SP22.

In step SP22, the control unit 20 of the mobile PC 1 determines whether or not the user's fingertip has moved on the touch panel TP during selection of the link button L1 by the pointer P1. When a negative result is obtained on this determination, it indicates that the condition of selection of the link button L1 by the pointer P1 is being continued because the user's fingertip is not moving on the touch panel TP. In this case, the control unit 20 of the mobile PC 1 returns to step SP21, to repeat the above-mentioned processing.

On the other hand, when an affirmative result is obtained upon determination in step SP22, it means that the user's fingertip has moved without separating from the touch panel TP, i.e., the pointer P1 has moved and the tip part H1 of the pointer P1 comes not to select the link button L1. In this instance, the control unit 20 of the mobile PC 1 enters the next step S23.

In step SP23, in view of the fact that the pointer P1 has come into the state of not selecting any of the link button L1 to L4, the control unit 20 of the mobile PC 1 returns the display color of the pointer P1 from red (selecting) to blue (non-selecting), and returns to step SP13.

Meanwhile, when an affirmative result is obtained upon determination in step SP21, it indicates that the user's fingertip has separated from the touch panel TP while the link button L1 has been kept selected by the pointer P1. In this case, the control unit 20 of the mobile PC 1 enters the next step SP24, while leaving the pointer P1 displayed in red.

In step SP24, the control unit 20 of the mobile PC 1 determines whether or not the fingertip once separated from the touch panel TP has again touched the pointer P1 before the lapse of a predetermined period of time. If the determination result here is affirmative, the control unit 20 enters the next step SP25.

On the other hand, if a negative result is obtained upon determination in step S24, it means that the pointer P1 has not been again touched by the user's fingertip before the lapse of the predetermined period of time and, hence, that the user does not have an intention of deciding to select the link button L1 being selected by the pointer P1. In this instance, the control unit 20 of the mobile PC 1 returns to step SP1, to repeat the above-mentioned processing.

In step SP25, the control unit 20 of the mobile PC 1 determines whether or not the user's fingertip having again performed the touch operation on the touch panel TP has moved without separating from the touch panel TP. When the determination result is affirmative, the control unit 20 jumps to step SP17, where it erases the past pointer P1 having been present at the display position relevant to selection of the link button L1, and then goes back again to step SP13, to repeat the above-mentioned processing.

On the other hand, if a negative result is obtained upon determination in step SP25, it means that the user's fingertip having again performed the touch operation on the touch panel TP has not moved. In this case, the control unit 20 of the mobile PC 1 enters the next step SP26.

In step SP26, the control unit 20 of the mobile PC 1 determines whether or not the user's fingertip having again touched the pointer P1 on the touch panel TP has again separated without deviating from the position of touching. If the determination result is negative, the control unit 20 returns to step SP25, and repeats the above-mentioned processing.

On the other hand, when an affirmative result is obtained upon determination in step SP26, it indicates that the user's fingertip having again touched the pointer P1 on the touch panel TP has again separated without deviating from the position of touching, in other words, an input operation for finally deciding to select the link button L1 being selected by the pointer P1 has been carried out by the user. In this instance, the control unit 20 of the mobile PC 1 enters the next step SP27.

In step SP27, the control unit 20 of the mobile PC 1 actually executes a predetermined button instruction allocated to the link button L1, and then enters the next step SP28.

In step SP28, the control unit 20 of the mobile PC 1, in view of its having actually executed the predetermined button instruction corresponding to the link button L1, erases the pointer P1 used to select the link button L1, and moves to step SP29, so as to terminates the process.

In this manner, the control unit 20 of the mobile PC 1 can, in the case of the normal action, display the pointer P1 having the tip part H1 capable of acting (moving) like a pendulum, at the display position according to the location of the user's fingertip performing a touching operation on the touch panel TP. Therefore, a desired one of the link button L1 to L4 can be easily selected by the pointer P1, and the selection can then be decided by a simple operation of touching the pointer P1 with the fingertip.

(6-2) Input Procedure Using Normal Action and Attraction Action in Combination

Figure 17:
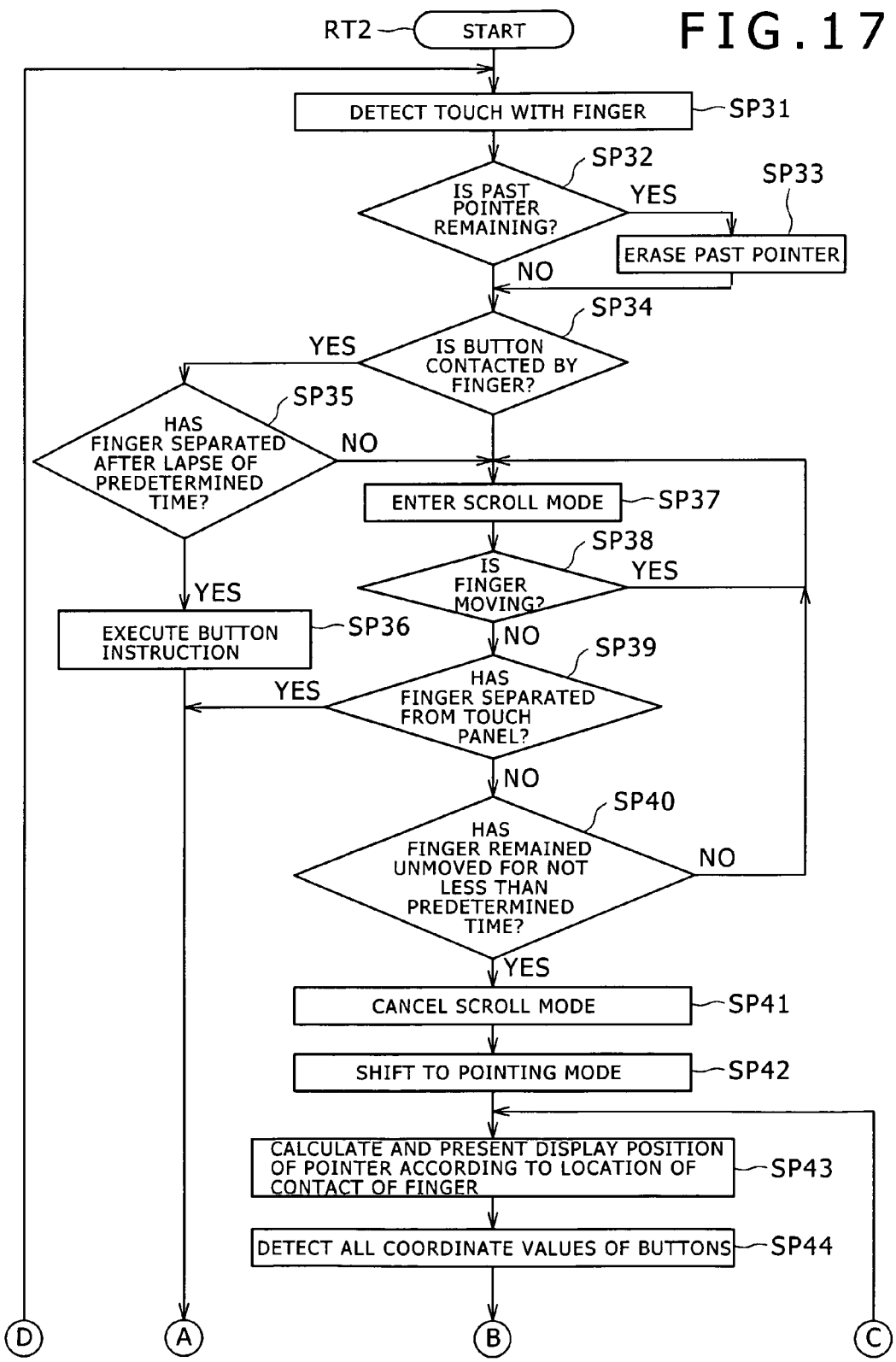
FIG. 17 is a flowchart showing an input procedure using a normal action and an attraction action in combination, (1)
Figure 18:
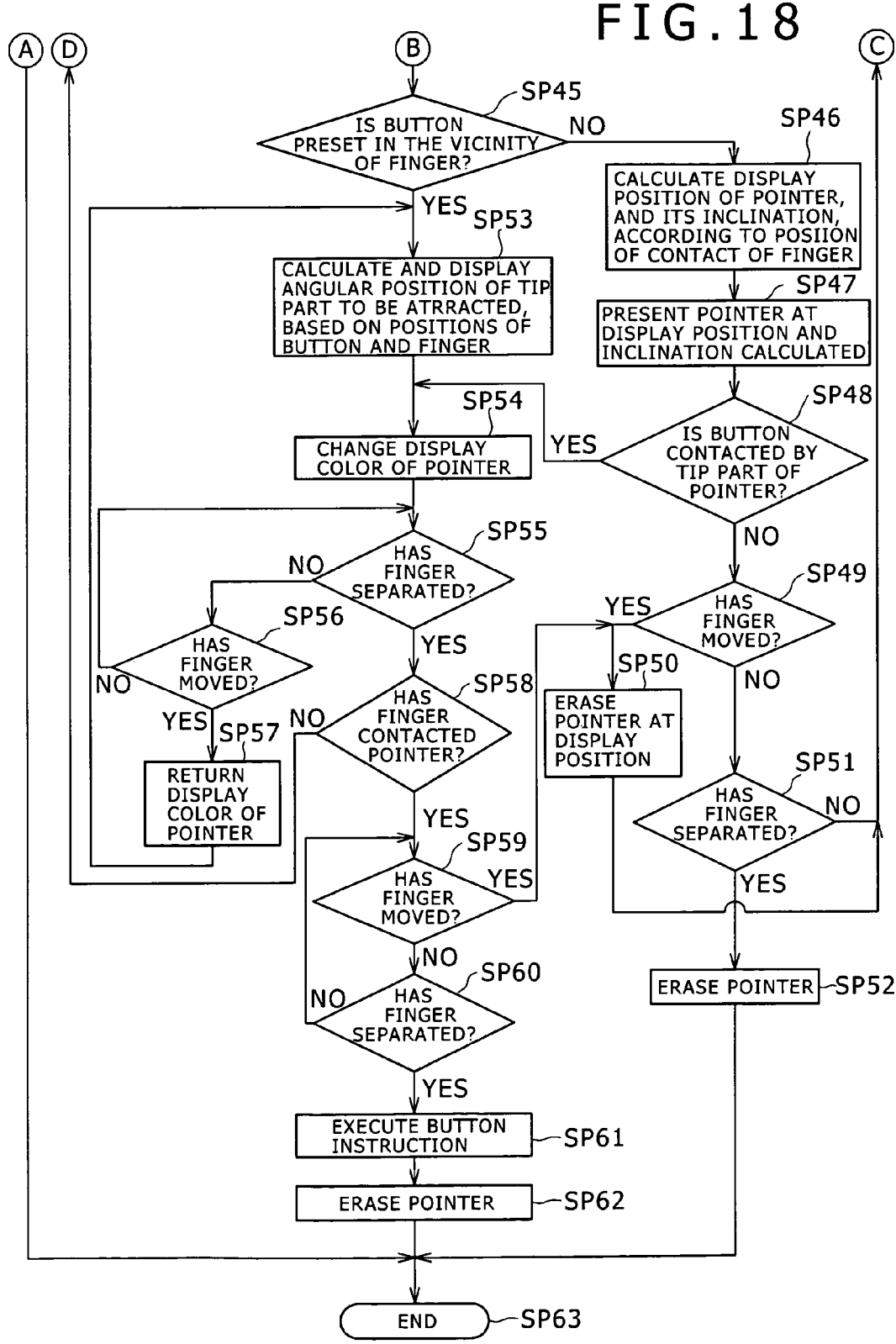
FIG. 18 is a flowchart showing the input procedure using the normal action and the attraction action in combination, (2)

Next, as shown in FIGS. 17 and 18, the control unit 20 of the mobile PC 1, according to the pointer generating program prepared as an application program, commences a routine RT1 through a START step thereof, and moves to the next step SP 31. When it is detected here that the touch panel TP of the display unit 3 is touched by the user's fingertip, the control unit 20 enters the next step SP32.

In step SP32, the control unit 20 of the mobile PC 1 determines whether or not the pointer P1 presented on the display unit 3 in the past is remaining unerased. When an affirmative result is obtained upon this determination, the control unit 20 moves to the next step SP33, where it erases the pointer P1 presented in the past, and then moves to the next step SP34.

On the other hand, when a negative result is obtained upon determination in step SP32, it indicates that the user's fingertip has touched the touch panel TP for the first time, and not any pointer P1 presented in the past is remaining on the display unit 3. In this case, the control unit 20 of the mobile PC 1 enters the next step SP34 immediately, i.e., without executing any operation.

In step SP34, the control unit 20 of the mobile PC 1 determines whether or not either of the link button L1L and the link button L1R (FIGS. 9 to 11) in the image displayed on the display unit 3 is directly contacted by the user's fingertip. This determination is made based on the difference between coordinate values on the display unit 3 for the link button L1L and the link button L1R and coordinate values on the display unit 3 for the contact position of the finger.

When an affirmative determination result is obtained here, it shows that one of the link button L1L and the link button L1R as the objects of selection by the user's fingertip, for example, the link button L1L, is being touched by the user's fingertip directly, rather than through the pointer P1. In this instance, the control unit 20 of the mobile PC 1 moves to the next step SP35.

On the other hand, when a negative results is obtained upon determination in step SP34, it means that neither of the link button L1L and the link button L1R (FIGS. 9 to 11) is contacted directly by the user's finger. In this instance, the control unit 20 enters the next step SP37.

In step SP35, the control unit 20 of the mobile PC 1 determines whether or not the user's finger having directly touched the link button L1L, for example, has separated from the link button L1L after the lapse of a predetermined period of time (e.g., 1.5 sec).

If an affirmative determination result is obtained here, it indicates that the user's fingertip having directly touched the link button L1L has separated from the link button L1L after remaining in contact with the link button L1L for at least the predetermined period of time (e.g., 1.5 sec), i.e., the link button L1L has been determinably selected by the user. In this case, the control unit 20 of the mobile PC 1 enters the next step SP36.

In step SP36, the control unit 20 of the mobile PC 1 executes a predetermined button instruction allocated to the link button L1L, and goes to the next step SP63, thereby terminating the process.

On the other hand, when the result of determination in step SP35 is negative, it shows that the user's fingertip having directly touched either of the link buttons L1L, L1R has separated from the relevant link button before the lapse of the predetermined period of time (e.g., 1.5 sec), i.e., one of the link button L1L and the link button L1R has been merely touched by the user's fingertip momentarily, rather than being determinately selected by the fingertip. In this case, the control unit 20 of the mobile PC 1 moves to step SP37.

In step SP37, based on the fact that neither of the link button L1L and the link button L1R is being directly touched by the user's fingertip, the control unit 20 of the mobile PC 1 determines that the user's fingertip has probably moved vertically or horizontally within a predetermined period of time from the moment of the touching, and effects a transition to the scroll mode. In the scroll mode, the image displayed on the display unit is scrolled vertically or horizontally by the control unit 20 according to the moving direction (the vertical direction or the horizontal direction) of the fingertip, and the control unit 20 enters the next step SP38.

In step SP38, the control unit 20 of the mobile PC 1 determines whether or not the user's fingertip is moving on the touch panel TP after the transition to the scroll mode. When the user's fingertip is moving, an affirmative determination result is obtained, and the control unit 20 goes back again to step SP37, thereby continuing the scrolling of image in the scroll mode.

On the other hand, when the result of determination in step SP38 is negative, it indicates that the user's fingertip is not moving on the touch panel TP notwithstanding the transition to the scroll mode has been made. In this instance, the control unit 20 of the mobile PC 1 enters the next step SP39, without scrolling the image.

In step SP39, the control unit 20 of the mobile PC 1 determines whether or not the user's fingertip has separated from the touch panel TP. When the determination result is affirmative, it indicates that the user's fingertip has separated from the touch panel TP while the mobile PC 1 has been in the scroll mode. In this instance, the control unit 20 of the mobile PC 1 goes to step SP63, thereby terminating the process.

On the other hand, when a negative result is obtained upon determination in step SP39, it means that the user's fingertip has not moved but the fingertip remains touching the touch panel TP without separating from the touch panel TP. In this case, the control unit 20 of the mobile PC 1 enters the next step SP40.

In step SP40, the control unit 20 of the mobile PC 1 determines whether or not the user's fingertip touching the touch panel TP has remained unmoved (without separating) for not less than a predetermined period of time.

When a negative determination result is obtained here, it indicates that the user's fingertip has restarted moving before the lapse of a predetermined period of time, i.e., a scroll instruction has been given again. In this instance, the control unit 20 of the mobile PC 1 goes back again to step SP37, thereby restarting scrolling.

On the other hand, when the result of determination in step SP40 is affirmative, it indicates that the user's fingertip touching the touch panel TP has remained unmoved (without separating) for at least the predetermined period of time. In this case, the control unit 20 of the mobile PC 1 enters the next step SP41.

In step SP41, the control unit 20 of the mobile PC 1 determines that the user does not have an intention of inputting a scroll instruction in this instance, and cancels the scroll mode. The control unit 20 then enters the next step SP42, to make a shift to the pointing mode, and thereafter enters the next step SP43.

Incidentally, the contents of processing from step SP31 to step SP42 are fundamentally the same as the contents of processing from step SP1 to step SP12 in the input procedure using the normal action in the routine RT1 described above.

In step SP43, the control unit 20 of the mobile PC 1 calculates a display position on the display unit 3 of the pointer P1 according to the location on the touch panel TP where the touch operation is made by the user's fingertip, and displays the pointer in a predetermined display color (e.g., blue) at the display position calculated, whereby the pointer P1 is presented in such a form as to appear as if it were extending vertically upward from the user's fingertip. Then, the control unit 20 enters the next step SP44.

In this case, in the control unit 20 of the mobile PC 1, unlike in the routine RT 1 (FIGS. 15 and 16), not the normal action but the attraction action is being selected, so that the tip part H1 of the pointer P1 appears as if it were attracted (sucked) onto the link button L1L or the link button L1R present in a predetermined range from the user's fingertip. Therefore, it is unnecessary to calculate the inclination of the tip part H1 of the pointer P1.

In step SP44, the control unit 20 of the mobile PC 1 detects all the coordinate values of the centers of the link button L1L (FIGS. 9 and 10) and the link button L1R (FIG. 11) present in the image displayed on the display unit 3, and moves to the next step SP45.

In step SP45, the control unit 20 of the mobile PC 1 determines whether or not the link button L1L or the link button L1R is present in the vicinity of the user's fingertip touching the touch panel TP.

When a negative determination result is obtained here, it indicates that the user's fingertip touching the touch panel TP is not contained in a predetermined range centered on the coordinate values of the link button L1L or the link button L1R present in the image displayed on the display unit 3. Thus, it is shown that the pointer P1 is not in a condition for the attraction action in which the tip part H1 of the pointer P1 is to be attracted onto the link button L1L or the link button L1R, and that the pointer P1 is to be shifted from the attraction action to the normal action. In this instance, the control unit 20 of the mobile PC 1 moves to the next step SP46.

In step SP46, for the shift from the attraction action to the normal action, the control unit 20 of the mobile PC 1 calculates the display position on the display unit 3 of the pointer P1 according to the location on the touch panel TP where the touch operation is made by the user's fingertip, and calculates the inclination of the tip part H1 of the pointer P1 to be displayed in this instance. The control unit 20 then enters the next step SP47.

In step SP47, the control unit 20 of the mobile PC 1 displays the pointer P1 with the tip part H1 having the inclination calculated in step SP46, in a predetermined display color (e.g., blue), at the display position on the display unit 3 also calculated in step SP46. This results in that the pointer P1 is presented in such a form as to appear as if it were extending from the user's fingertip. Then, the control unit 20 enters the next step SP48.

In this case, as has been shown in FIGS. 5 to 7, the inclination of the tip part H1 of the pointer P1 is varied in a pendulum-like manner according to the position of the fingertip relative to the touch panel TP of the display unit 3. Therefore, the control unit 20 of the mobile PC 1 enables easy selection of the link button L1L or the link button L1R which is desired by the user.

In step SP48, the control unit 20 of the mobile PC 1 determines whether or not the tip part H1 of the pointer P1 presented on the display unit 3 is touching the link button L1L, for example. If the determination result is negative, the control unit 20 enters the next step SP49. On the other hand, when the determination result is affirmative, it indicates that the link button L1L, for example, is currently selected by the pointer P1. In this instance, the control unit 20 moves to step SP54.

In step SP49, the control unit 20 of the mobile PC 1 determines whether or not the user's fingertip has moved on the touch panel TP with the tip part H1 of the pointer P1 not touching the link button L1L.

When an affirmative determination result is obtained here, it means that the pointer P1 is continuing to move on the touch panel TP due to a movement of the user's fingertip. In this case, the control unit 20 of the mobile PC 1 moves to the next step SP50.

In step SP50, the control unit 20 of the mobile PC 1 erases the pointer P1 once presented at the display position in step SP47 attendant on the movement of the fingertip, and then goes back again to step SP43, to repeat the above-mentioned processing.

On the other hand, when a negative result is obtained upon determination in step SP49, it indicates that the user's fingertip has not moved with the tip part H1 of the pointer P1 not touching either of the link button L1L and the link button L1R, while with the user's fingertip has not moved on the touch panel TP. In this instance, the control unit 20 of the mobile PC 1 enters the next step SP51.

In step SP51, the control unit 20 of the mobile PC 1 determines whether or not the user's fingertip has separated from the touch panel TP in this condition. If a negative determination result is obtained, the control unit 20 repeats the processing of step SP43 and the subsequent steps, thereby continuing presenting the pointer P1.

On the other hand, when an affirmative result is obtained upon determination in step SP51, it indicates that the user's fingertip has separated from the touch panel TP with the tip part H1 of the pointer P1 not touching either of the link button L1L and the link button L1R. In this instance, the control unit 20 of the mobile PC 1 enters the next step SP52.

In step SP52, in view of the fact that the user's fingertip has separated from the touch panel TP, the control unit 20 of the mobile PC 1 erases the pointer P1 having been presented, thereby finishing the pointing mode of the normal action, and goes to step SP63, thereby terminating the process.

On the other hand, when the result of determination in step SP45 is affirmative, it indicates that the position of the user's fingertip relative to the touch panel TP is contained in the predetermined range centered on the coordinate values of the link button L1L or the link button L1R present in the image displayed on the display unit 3, and that the tip part H1 of the pointer P1 is to be attracted onto the link button L1L or the link button L1R. In this instance, the control unit 20 of the mobile PC 1 enters the next step SP53.

In step SP53, the control unit 20 of the mobile PC 1 calculates an angular position (orientation) of the tip part H1 at the time of attraction thereof onto the link button L1L or the link button L1R and a display position for the pointer P1, based on the coordinate values of the link button L1L or the link button L1R and the coordinate values of the user's fingertip. Then, the control unit 20 displays the pointer P1, based on the calculation results. This results in that the pointer P1 is presented as if the tip part H1 of the pointer P1 were being attracted (sucked) onto the link button L1L or the link button L1R. Then, the control unit 20 enters the next step SP54.

In step SP54, the control unit 20 of the mobile PC 1 changes the display color of the pointer P1, for example, from the initial blue (non-selecting) to red (selecting), thereby visually informing the user that, for example, the link button L1L is currently selected by the pointer P1. Then, the control unit 20 enters the next step SP55.

In step SP55, the control unit 20 of the mobile PC 1 determines whether or not the user's fingertip has separated from the touch panel TP with the link button L1L being selected by the pointer P1. When a negative determination result is obtained, the control unit 20 enters the next step SP56.

In step SP56, the control unit 20 of the mobile PC 1 determines whether or not the user's fingertip has moved on the touch panel TP with the link button L1L being selected by the pointer P1. When a negative determination result is obtained here, it indicates that the selection of the link button L1L by the pointer P1 is being continued. In this instance, the control unit 20 of the mobile PC 1 returns to step SP55, to repeat the above-mentioned processing.

On the other hand, when the result of determination in step SP56 is affirmative, it means that the user's fingertip has moved without separating from the touch panel TP, i.e., the pointer P1 has moved and the tip part H1 of the pointer P1 has come not to select the link button L1L. In this instance, the control unit 20 of the mobile PC 1 enters the next step SP57.

In step SP57, in view of the fact that neither of the link button L1L and the link button L1R is being selected by the pointer P1, the control unit 20 of the mobile PC 1 returns the display color of the pointer P1 from red (selecting) to blue (non-selecting), and returns to step SP53.

Meanwhile, when an affirmative result is obtained upon determination in step SP55, it indicates that the user's fingertip has separated from the touch panel TP with the link button L1L being selected by the pointer P1. In this case, the control unit 20 of the mobile PC 1 leaves the pointer P1 displayed in red (selecting) and enters the next step SP58.

In step SP58, the control unit 20 of the mobile PC 1 determines whether or not the user's fingertip once separated from the touch panel TP has again touched the pointer P1 before the lapse of a predetermined period of time. When the determination result is affirmative, the control unit 20 enters the next step SP59.

On the other hand, if the result of determination in step SP58 is negative, it indicates that the pointer P1 has not been again touched by the user's fingertip before the lapse of the predetermined period of time and that the user does not have an intention of deciding to select the link button L1L or the link button L1R being selected by the pointer P1. In this case, the control unit 20 of the mobile PC 1 returns to step SP31, to repeat the above-mentioned processing.

In step SP59, the control unit 20 of the mobile PC 1 determines whether or not the user's fingertip having again touched the touch panel TP has moved without separating from the touch panel TP. When the determination result is affirmative, the control unit 20 jumps to step SP50, where it erases the past pointer P1 present at the display position relevant to selection of the link button L1L. Thereafter, the control unit 20 goes back again to step SP43, and repeats the above-mentioned processing.

On the other hand, if the result of determination in step SP59 is negative, it indicates that the user's fingertip having again touched the pointer P1 on the touch panel TP has not moved. In this instance, the control unit 20 of the mobile PC 1 enters the next step SP60.

In step SP60, the control unit 20 of the mobile PC 1 determines whether or not the user's fingertip having again touched the pointer P1 on the touch panel TP has again separated without deviating from the position of touching. When the determination result is negative, the control unit 20 returns to step SP59, and repeats the just-mentioned processing.

On the other hand, when an affirmative result is obtained upon determination in step SP60, it means that an input operation for finally deciding to select the link button L1L being selected by the pointer P1 has been conducted by the user. In this instance, the control unit 20 of the mobile PC 1 enters the next step SP61.

In step SP61, the control unit 20 of the mobile PC 1 actually executes a predetermined button instruction allocated to the link button L1L, and then enters the next step SP62.

In step SP62, in view of its having actually executed the predetermined button instruction corresponding to the link button L1L, the control unit 20 of the mobile PC 1 erases the pointer P1 having been selecting the link button L1L, and moves to the next step SP63, to terminate the process.

In this manner, in the case where the normal action and the attraction action are adopted in combination, when the position of the user's fingertip relative to the touch panel TP is not contained in a predetermined range centered on the coordinate values of the link button L1L or the link button L1R present in the image displayed on the display unit 3 and, hence, it is unnecessary for the tip part H1 of the pointer P1 to be attracted onto the link button L1L or the link button L1R, the control unit 20 of the mobile PC 1 switches the pointer P1 to a pointer P1 of which the tip part H1 acts (moves) in a pendulum-like manner according to the normal action described above.

In addition, when the position of the user's fingertip relative to the touch panel TP is contained in a predetermined range centered on the coordinate values of the link button L1L or the link button L1R present in the image displayed on the display unit 3 and, hence, it is necessary for the tip part H1 of the pointer P1 to be attracted onto the link button L1L or the link button L1R, the control unit 20 of the mobile PC 1 performs such a control that the tip part H1 of the pointer P1 is automatically attracted onto the link button L1L or the link button L1R without need to bring the user's fingertip further closer to the link button L1L or the link button L1R. This facilitates selection of the link button L1L or the link button L1R that is desired by the user. As a result, the link button L1L or the link button L1R can be determinately selected by a simple operation of touching the pointer P1 with a fingertip.

(7) Another Decision Technique for Link Button

Meanwhile, the control unit 20 of the mobile PC 1 is so designed as to decide selection when the pointer P1 is again touched in the condition where one of the link buttons L1 to L4 or the link buttons L1L and L1R is selected by the pointer P1, as has been described above. However, this design is not limitative, and a variety of forms can be considered.

Figure 19:
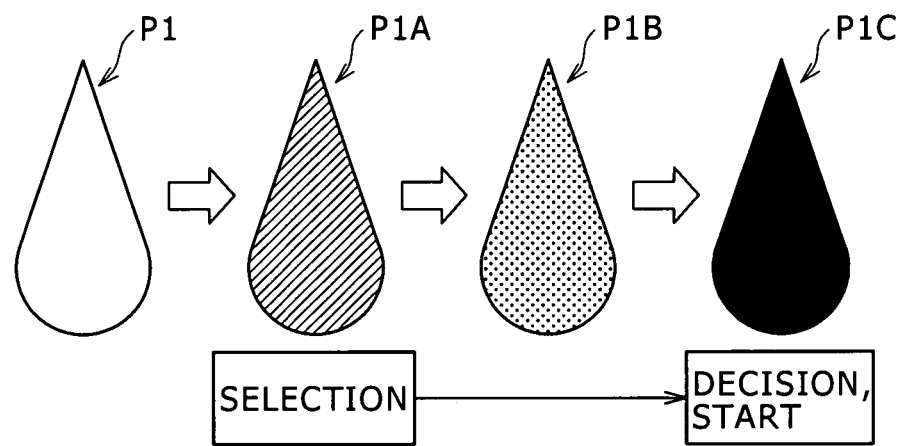
FIG. 19 is a diagrammatic illustration of a decision technique based on dwelling time of a pointer, (1)

For example, as shown in FIG. 19, when one of the link buttons L1 to L4 or the link buttons L1L and L1R is selected by the pointer P1 displayed in blue which represents a non-selecting state, the control unit 20 of the mobile PC 1 changes the display color to red of a pointer P1A which means a selecting state.

Thereafter, upon the lapse of, for example, 2 sec with one of the link buttons L1 to L4 or the link buttons L1L and L1R being selected, the control unit 20 of the mobile PC 1 changes the display color from the red of the pointer P1A to a gradually deepened display color of a pointer P1B. Upon the lapse of further 2 sec, the control unit 20 changes the display color finally to black of a pointer P1C so that it is recognized that selection of the one of the link buttons L1 to L4 or the link buttons L1L and L1R is decided.

Figure 20:
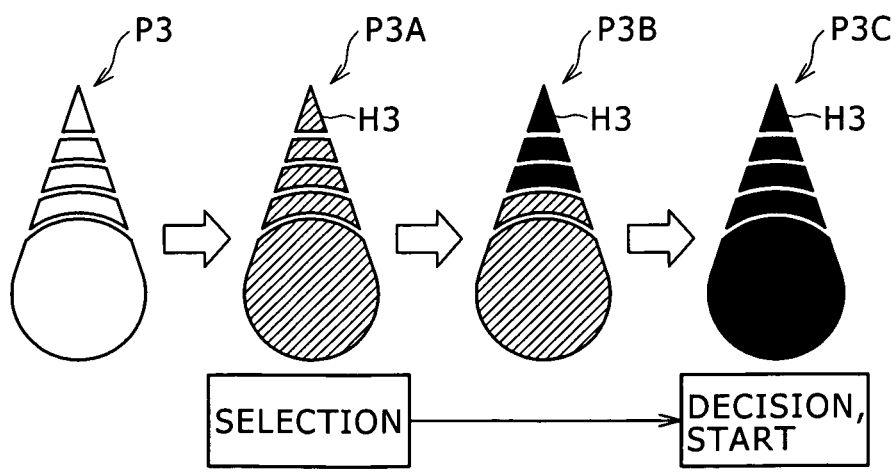
FIG. 20 is a diagrammatic illustration of a decision technique based on dwelling time of a pointer, (2)

Similarly, as shown in FIG. 20, when a pointer P3 having a tip part H3 chopped up into small blocks is initially used and one of the link buttons L1 to L4 or the link buttons L1L and L1R is selected by a pointer P3 displayed in blue which represents a non-selecting state, the control unit 20 of the mobile PC 1 changes the display color of the whole part of the pointer to red of a pointer 3A which means a selecting state.

Thereafter, upon the lapse of, for example, 2 sec with one of the link buttons L1 to L4 or the link buttons L1L and L1R being selected, the control unit 20 of the mobile PC 1 changes the pointer to a pointer P3B in which the tip part H3 in the form of small blocks displayed in red has display colors gradually deepened block by block. Upon the lapse of further 2 sec, the control unit 20 changes the display color finally to black of a pointer P3C the whole part of which is displayed in black so that it is recognized that selection of the one of the link buttons L1 to L4 or the link buttons L1L and L1R is decided.

Figure 21:
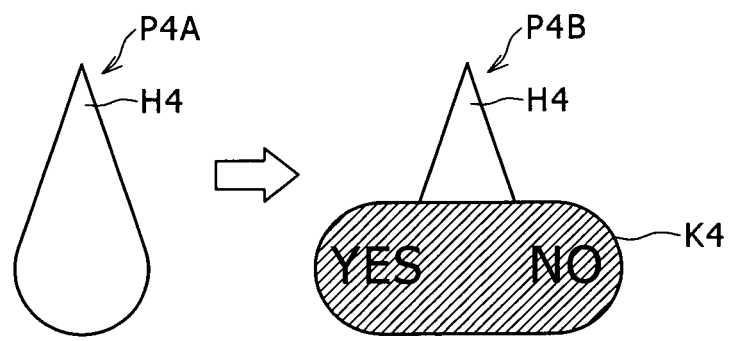
FIG. 21 is a diagrammatic illustration of a pointer combined with a sub-button, (1)

In addition, as shown in FIG. 21, the control unit 20 of the mobile PC 1 is so designed that, when the link buttons L1 to L4 or the link buttons L1L and L1R are not yet selected, a pointer P4A having the same form as the ordinary pointer P1 (FIG. 3) is displayed, and that, when one of the link buttons L1 to L4 or the link buttons L1L and L1R is selected by the pointer P4A, a sub-button part K4 for deciding selection of the one of the link buttons L1 to L4 or the link buttons L1L and L1R can be displayed in the condition where only a tip part H4 of the pointer P4A is left intact.

The sub-button part K4 has a structure in which a symbol "YES" meaning decision when touched is written on the left side whereas a symbol "NO" meaning cancellation when touched is written on the right side. In the mobile PC 1 with this structure, the symbols on the sub-button K4 can be selected with the fingertip being used to operate the pointer P4B.

Specifically, as shown in FIGS. 22A and 22B, when a link icon L8 displayed on the display unit 3 is selected by the pointer P4A, the control unit 20 of the mobile PC 1 immediately displays the sub-button part K4 while leaving only the tip part H4 of the pointer P4A intact so that either "YES" or "NO" can be selected with the user's fingertip.

In this case, the control unit 20 of the mobile PC 1 ensures that, after the link icon L8 is selected by the pointer P4A, the user can immediately select decision or cancellation, without need to wait for a predetermined period of time.

Figure 23:
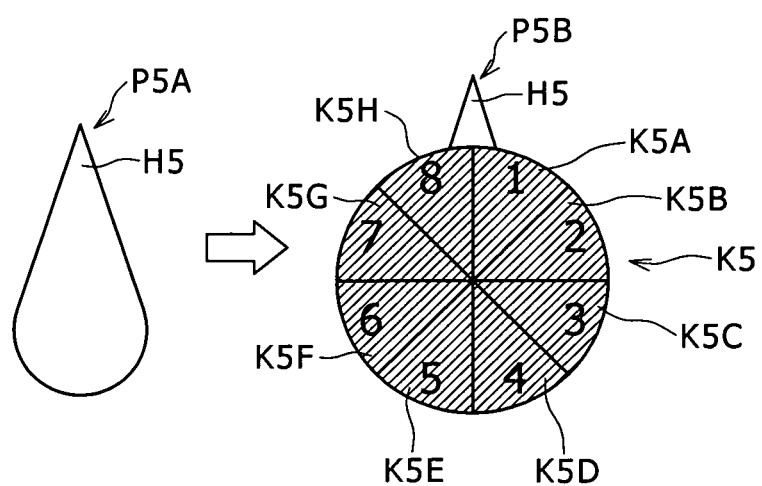
FIG. 23 is a diagrammatic illustration of a pointer combined with a sub-button, (2)

Further, as shown in FIG. 23, when the link buttons L1 to L4 or the link buttons L1L and L1R are not yet selected, the control unit 20 of the mobile PC 1 displays a pointer P5A having the same form as the ordinary pointer P1 (FIG. 3).

However, the control unit 20 of the mobile PC 1 is so designed that, when one of the link buttons L1 to L4 or the link buttons L1L and L1R is selected by the pointer P5A, a circular sub-button part K5 for deciding selection of the one of the link buttons L1 to L4 or the link buttons L1L and L1R is displayed in the condition where only a tip part H5 of the pointer P5A is left intact.

The circular sub-button part K5 has a plurality of selection areas K5A to K5H which are formed by equally dividing a circle into eight segments and on which numerals "1" to "8" are marked, respectively. Therefore, the control unit 20 of the mobile PC 1 is so designed that, for example, one of eight icons in a drop-down menu opened upon selection of the link icon L1, for example, can be decisively selected by selecting the corresponding one of the selection areas K5A to K5H in the sub-button part K5 with a fingertip.

Figure 24A:
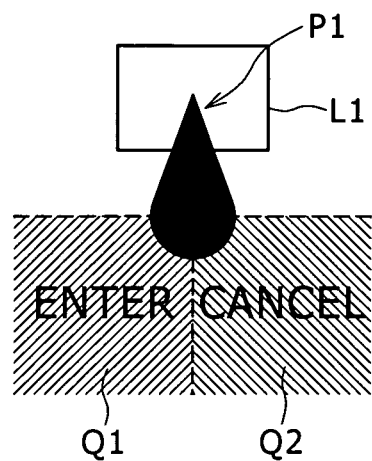
FIGS. 24A and 24B are diagrammatic illustrations of an on-screen decision technique.

Further, as shown in FIG. 24A, the control unit 20 of the mobile PC 1 is designed for right-handed users so that when it is recognized that the link button L1 is selected by the pointer P1, a decision area Q1 marked with "ENTER" and a cancellation area Q2 marked with "CANCEL" are displayed respectively in a left lower area and a right lower area relative to the pointer P1.

With this configuration, the control unit 20 of the mobile PC 1 ensures that, after the link icon L1 is selected by the pointer P1, the user can immediately select an operation to "enter" or "cancel" the selection by simply touching the decision area Q1 or the cancellation area Q2 with the fingertip used to select the link icon L1, without need to wait for a predetermined period of time.

Figure 24B:
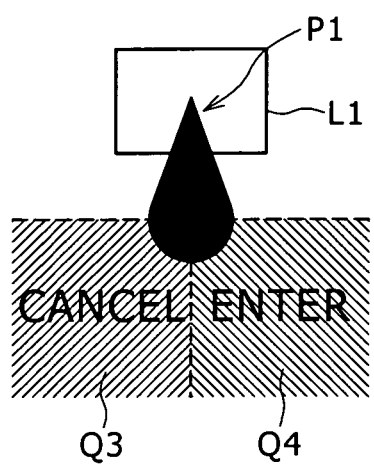

Incidentally, as shown in FIG. 24B, the control unit 20 of the mobile PC 1 is designed for left-handed users (contrary to the case of FIG. 24A) so that when it is recognized that the link button L1 is selected by the pointer P1, a cancellation area Q3 marked with "CANCEL" and a decision area Q4 marked with "ENTER" are displayed respectively in a left lower area and a right lower area relative to the pointer P1.

In this case, also, the control unit 20 of the mobile PC 1 ensures that, after the link icon L1 is selected by the pointer P1, the user can immediately select an operation to "enter" or "cancel" the selection by simply touching the decision area Q4 or the cancellation area Q3 with the fingertip used to select the link icon L1, without need to wait for a predetermined period of time.

Figure 25:
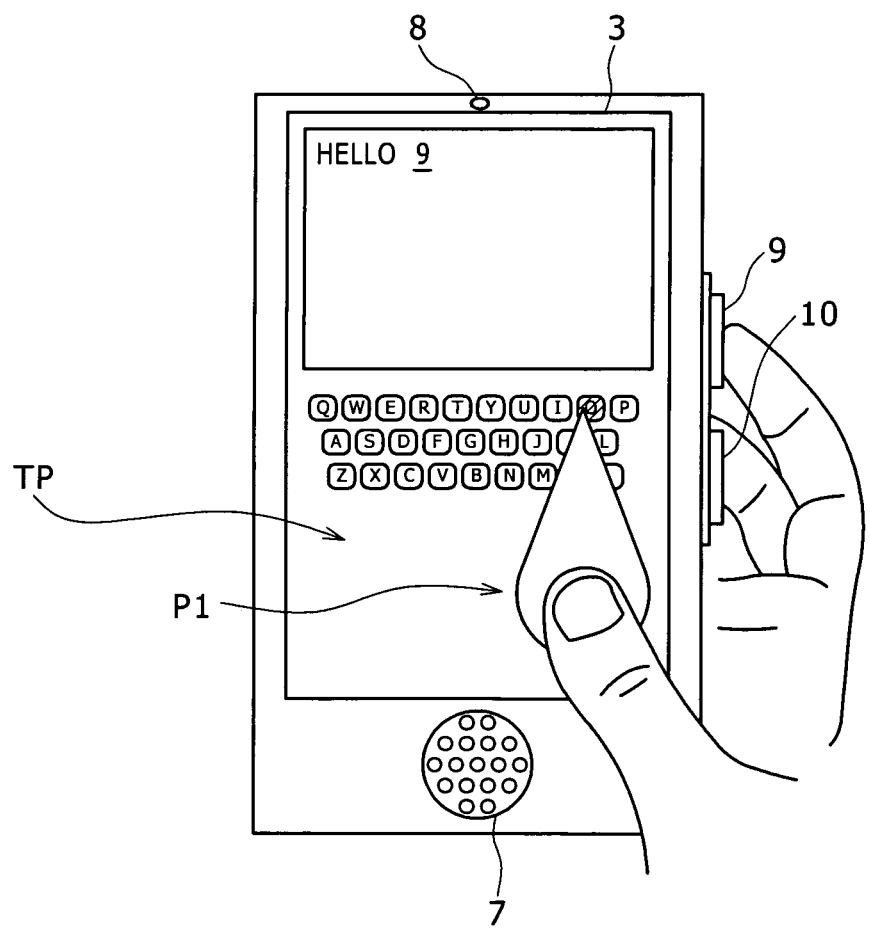
FIG. 25 is a diagrammatic illustration of a physical decision technique.

Furthermore, as shown in FIG. 25, the control unit 20 of the mobile PC 1 is so designed that, when it is recognized that a physically arranged ON switch 9 is depressed for a display key "9" selected by the pointer P1, "9" is decided as an object of input, and when it is recognized that a physically arranged OFF switch 10 is depressed for the display key "9" selected by the pointer P1, "9" is cancelled without being decided as an object of input.

(8) Operation and Effects

In the above-described configuration, the control unit 20 of the mobile PC 1, in response to the contact point upon touching of the user's fingertip on the touch panel TP, sets a circular area AR with a predetermined radius containing the contact point, generates a pointed-shaped pointer P1 in which an isosceles triangular tip part H1 is integrally merged into the area AR, and displays the pointer P1 on a display unit 3.

As a result, the control unit 20 of the mobile PC 1 can present to the user a pointed-shaped pointer P1 by which the position (contact point) of the user's fingertip relative to the touch panel TP and, for example, a link button L1 displayed on the display unit 3 can be connected to each other with a predetermined interval therebetween.

Thus, the control unit 20 of the mobile PC 1 can give the user an impression as if the tip part H1 of the pointer P1 were extending from the user's fingertip and, simultaneously, can give the user a feeling of integrity of the user's fingertip and the pointer P1 and a feeling of operation in which the user's fingertip and the pointer P1 operate in conjunction with each other.

Therefore, the control unit 20 of the mobile PC 1 enables indirect selection of the link button L1 through the tip part H1 of the pointer P1 presented as if it were extending from the user's fingertip, instead of a direct touch operation on the link button L1 by the user's fingertip.

In other words, the control unit 20 of the mobile PC 1 is so designed that the position pointed at by the tip part H1 corresponding to a part of the pointer P1 exclusive of the contact point of the user's fingertip can be detected as a hotspot, whereby the link button L1 pointed at by the tip part H1 of point P1 can be detected as the object of selection.

In addition, the control unit 20 of the mobile PC 1 is designed to be capable of providing a normal action in which the tip part H1 of the pointer P1 is made to act (move) in a pendulum-like manner according to the position of the user's fingertip and an attraction action in which when the user's fingertip is located in a predetermined range from a link button L1, for example, the tip part H is attracted onto the link button L1.

As a result, the control unit 20 of the mobile PC 1 can easily select any of the link buttons L1 to L4 or the link buttons L1L and L1R by the normal action or attraction action of the pointer P1 by only moving the user's fingertip in a minimum range, without moving the fingertip more largely than necessary on the tough panel TP.

In addition, the control unit 20 of the mobile PC 1 is so designed that when the user's fingertip is located on the lower side on the display unit 3, the image displayed on the display unit 3 is automatically scrolled in the direction of arrow as shown in FIG. 8, whereby the selecting action by the pointer P1 can be easily applied even to a link button L1D located at the lowermost end on the display unit 3.

Thus, the control unit 20 of the mobile PC 1 is so designed that any of the link buttons L1 to L4 or the link buttons L1L and L1R can be indirectly selected through the tip part H1 of the pointer P1, instead of a direct touching operation of the user's fingertip on one of the link buttons L1 to L4 or the link buttons L1L and L1R. Consequently, any desired one of the link buttons L1 to L4 or the link buttons L1L and L1R as objects of selection can be selected by the pointer P1 while all the link buttons L1 to L4 or the link buttons L1L and L1R are visible to the user, without being hidden by the fingertip.

Incidentally, the control unit 20 of the mobile PC 1 is so designed that when one of the link buttons L1 to L4 or the link buttons L1L and L1R is directly touched by a user's fingertip, the control unit 20 can recognize the selection and the decision of the selection, and, when one of the link buttons L1 to L4 or the link buttons L1L and L1R is indirectly touched through the pointer P1 owing to the normal action or the attraction action, also, the control unit 20 can recognize the selection and the decision of the selection. Accordingly, the convenience in use as an input interface can be enhanced remarkably.

According to the above-described configuration, the control unit 20 of the mobile PC 1 generates and displays the pointed-shaped pointer P1 appearing as if it were extending from the fingertip touching the touch panel TP, and the operation elements can be selected by the pointer P1. Consequently, any desired one of the small operation elements can be selected while all the operation elements are visible to the user without being hidden by the fingertip. Accordingly, operability of the mobile PC 1 for the user can be enhanced remarkably.

(9) Other Embodiments

Incidentally, while the case where the link buttons L1 to L4 or the link buttons L1L and L1R are used as operation elements which can be selected by the pointer P1 has been described in the embodiments above, the present invention is not limited to this case. In the present invention, icons as well as various keys such as alphabets, numerals, and symbols may be used as selectable operation elements.

In addition, while the case where the link button L1L or L1R is easily selected by the pointer P1 without horizontal automatic scroll of the image on the display unit 3 in each of the normal action and the attraction action during the pointing mode has been described in the embodiments above, the present invention is not limited to this case. Thus, the image displayed on the display unit 3 may be automatically scrolled horizontally, in addition to the pendulum-like motions of the tip part H1 of the pointer P1 during the normal action and the motions of the tip part H1 as if it were attracted (or sucked) onto the link button or the like during the attraction action.

Further, while the case where the normal action and the attraction action are used in combination in the input procedure for the routine RT2 has been described in the embodiments above, the present invention is not limited to this case. In the present invention, limitation to the input procedure using only the attraction action may be adopted.

Furthermore, while the cases where the input procedure using the normal action in the routine RT1 and the input procedure using the normal action and the attraction action in combination in the routine RT2 are executed according to the pointer generating program used as a preinstalled application program have been described in the embodiments above, the present invention is not limited to these cases. In the present invention, the above-mentioned input procedures may be executed according to a pointer generating program installed from a predetermined recording medium, a pointer generating program downloaded from internet, or any of pointer generating programs installed by way of other various kinds of routes.

Further, while the case where the pointer display device and the mobile PC 1 as an information apparatus are configured by use of the touch panel TP as a touch panel, the pointer display section and the control unit 20 as a hotspot detection section has been described in the embodiments above, the present invention is not limited to this case. In the present invention, the pointer display device and the information apparatus may be configured by use of a touch panel, a pointer display section and a hotspot detection section including ones of other various kinds of circuit configurations.

The pointer display device, the pointer display/detection method, the pointer display/detection program and the information apparatus according to embodiments of the present invention are applicable not only to, for example, portable information apparatuses but also to other various electronic apparatuses which require a GUI for selection of operation elements, such as desktop personal computers.

It should be understood by those skilled in the art that various modifications, combinations, sub-combinations and alterations may occur depending on design requirements and other factors insofar as they are within the scope of the appended claims or the equivalents thereof.

What is claimed is:

1. A pointer display device, comprising:
a touch panel provided on a display screen of a display section;
a pointer display section configured to detect a contact point of a touch operation on the touch panel and to display, in a portion of the display screen, a pointer icon whose boundary encloses a continuous area that includes the contact point;
a hotspot detection section configured to detect, as a hotspot, a position pointed to by one part of the pointer icon that is exclusive of the contact point; and
an operation element display section configured to display an operable operation element on the display screen,
wherein the pointer display section is configured, when the spacing between the operation element and the pointer icon becomes not more than a predetermined value, to enlarge the pointer icon so that the one part of the pointer icon is attracted onto the operation element.

2. The pointer display device according to claim 1, wherein the pointer display section is configured to deflect the orientation of the one part of the pointer icon to thereby change the pointer icon so that the one part of the pointer icon is attracted onto the operation element.

3. The pointer display device according to claim 1, wherein the pointer display section is configured to enlarge a length of the one part of the pointer icon from the contact point so that the one part of the pointer icon is attracted onto the operation element.

4. The pointer display device according to claim 1, wherein the one part of the pointer icon has a pointed shape and includes a tip part.

5. The pointer display device according to claim 1, further comprising:
a screen control section by which, when the pointer icon is recognized as being located at an end part on the display screen, the contents displayed on the display screen are moved according to the position of the pointer icon and displayed.

6. The pointer display device according to claim 1, wherein the pointer icon is pear-shaped, and the one part of the pointer icon is a pointed portion of the pear-shaped pointer icon.

7. A pointer display/detection method, comprising:
detecting a contact point of a touch operation on a touch panel provided over a display screen of a display section;
displaying, in a portion of the display screen, a pointer icon whose boundary encloses a continuous area that includes the contact point;
detecting, as a hotspot, a position pointed to by one part of the pointer icon that is exclusive of the touch point; and
displaying an operable operation element on the display screen,
wherein when the spacing between the operation element and the pointer icon becomes not more than a predetermined value, the pointer icon is enlarged so that the one part of the pointer icon is attracted onto the operation element.

8. A non-transitory recording medium having recorded thereon a computer program for carrying out a pointer display/detection method, the method comprising:
detecting a contact point of a touch operation on a touch panel provided over a display screen of a display section;
displaying, in a portion of the display screen, a pointer icon whose boundary encloses a continuous area that includes the contact point;
detecting, as a hotspot, a position pointed to by one part of the pointer icon that is exclusive of the touch point; and
displaying an operable operation element on the display screen,
wherein when the spacing between the operation element and the pointer icon becomes not more than a predetermined value, the pointer icon is enlarged so that the one part of the pointer icon is attracted onto the operation element.

9. An information apparatus, comprising:
a display section;
a touch panel provided on a display screen of a display section;
a pointer display section configured to detect a contact point of a touch operation on the touch panel and to display, in a portion of the display screen, a pointer icon whose boundary encloses a continuous area that includes the contact point;
a hotspot detection section configured to detect, as a hotspot, a position pointed to by one part of the pointer icon that is exclusive of the contact point; and
an operation element display section configured to display an operable operation element on the display screen,
wherein the pointer display section is configured, when the spacing between the operation element and the pointer icon becomes not more than a predetermined value, to enlarge the pointer icon so that the one part of the pointer icon is attracted onto the operation element.

10. The information apparatus according to claim 9, further comprising:
an operation element display section configured to display an operable operation element on the display screen, wherein when the contact point is on a lowermost region on the display screen and the pointer display section is configured to orient a tip of the pointer icon upward away from the lowermost region on the display screen but not over the operable operation element, the display section is operable to scroll images on the display screen in the upward direction.

11. The information apparatus according to claim 9, wherein when the pointer display section detects movement of the contact point in one of a horizontal or vertical direction at a velocity not less than a predetermined reference value, the display section is operable to scroll images on the display screen in the one of the horizontal or vertical direction.

12. The information apparatus according to claim 11, wherein when the pointer display section detects movement of the contact point in the one of the horizontal or vertical direction within a predetermined period of time from a moment of a touch operation, the display section is operable to scroll the images on the display screen in the one of the horizontal or vertical direction.

13. The information apparatus according to claim 11, wherein when the pointer display section detects a lack of movement of the contact point in the one of the horizontal or vertical direction for a predetermined period of time, the display section is operable to stop the scroll of the images on the display screen.

14. The information apparatus according to claim 9, wherein the pointer icon is pear-shaped, and the one part of the pointer icon is a pointed portion of the pear-shaped pointer icon.

\* \* \* \* \*